(12) United States Patent
Tateishi et al.

(10) Patent No.: US 6,584,048 B1
(45) Date of Patent: Jun. 24, 2003

(54) FOCUS JUMP DEVICE FOR REPRODUCING INFORMATION FROM A STORAGE MEDIUM

(75) Inventors: Kiyoshi Tateishi, Tsurugashima (JP); Kazuo Takahashi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/441,342

(22) Filed: Nov. 16, 1999

(30) Foreign Application Priority Data

Nov. 17, 1998 (JP) .......................................... 10-326936

(51) Int. Cl.[7] .............................................. G11B 7/095
(52) U.S. Cl. .................................. 369/44.28; 369/30.15
(58) Field of Search ........................... 369/44.27, 44.28, 369/30.15, 30.17

(56) References Cited

U.S. PATENT DOCUMENTS

| 5,034,941 A | * | 7/1991 | Kasai et al. ............... 369/44.27 |
| 5,090,001 A | * | 2/1992 | Ito et al. ................... 369/44.28 |
| 5,285,431 A | * | 2/1994 | Ogawa ..................... 369/30.17 |
| 5,892,742 A | * | 4/1999 | Yamashita et al. ........ 369/44.27 |
| 5,999,503 A | * | 12/1999 | Tateish et al. ........... 369/44.29 |
| 6,011,762 A | * | 1/2000 | Watanabe et al. ......... 369/44.27 |
| 6,151,280 A | * | 11/2000 | Naohara et al. .......... 369/44.27 |
| 6,370,093 B1 | * | 4/2002 | Tada et al. ............... 369/44.25 |

* cited by examiner

*Primary Examiner*—Aristotelis M. Psitos
(74) *Attorney, Agent, or Firm*—Ladas & Parry

(57) ABSTRACT

A focus jump moves a focus position of a light beam in a direction perpendicular to the storage medium to the focus position corresponding to a target recording layer so that the light beam is irradiated on the target recording layer. The device includes: a focus position moving unit for moving the focus position of the light beam; a focus error signal detector for detecting a focus error signal based on a variation of a returning light from the storage medium; a feedforward controller for supplying a drive signal to the focus position moving unit to move the focus position of the light beam in an acceleration state in an acceleration control and to move the focus position of the light beam in a deceleration state in a deceleration control; and a position controller for comparing the focus error signal, detected the time of movement of the focus position of the light beam to the target recording layer, with a predetermined target value to generate an error, and for feeding back the drive signal to the focus position moving-unit to reduce the error thereby to control the focus position of the light beam.

18 Claims, 20 Drawing Sheets

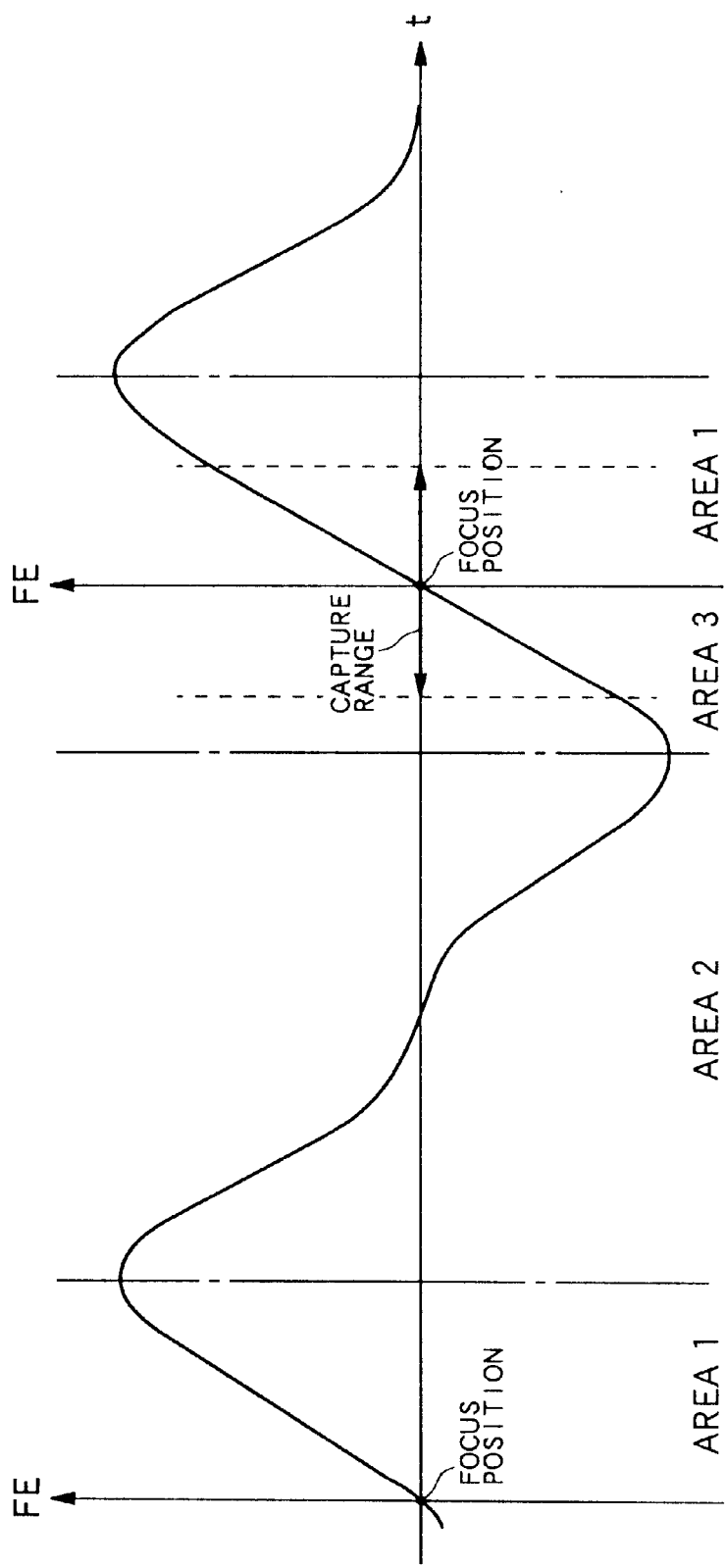

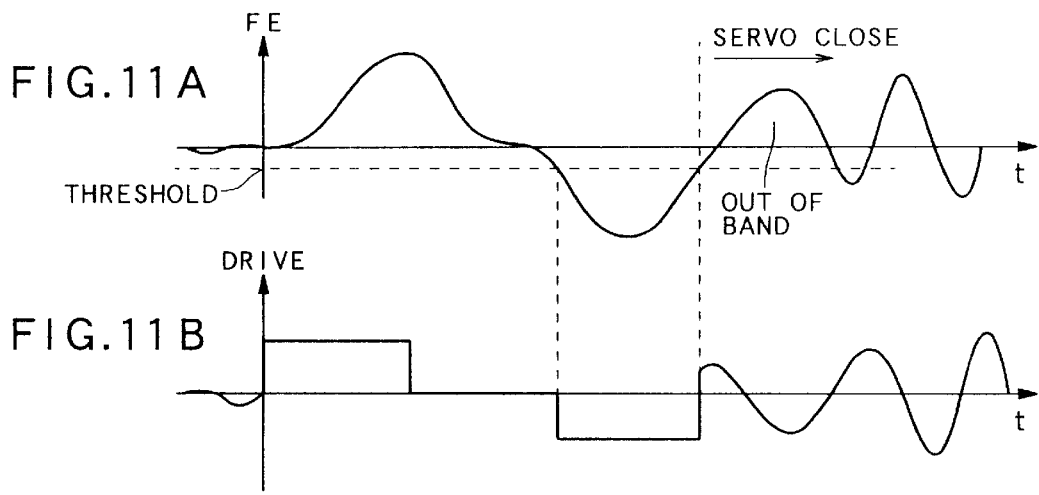
FIG.11A
FIG.11B
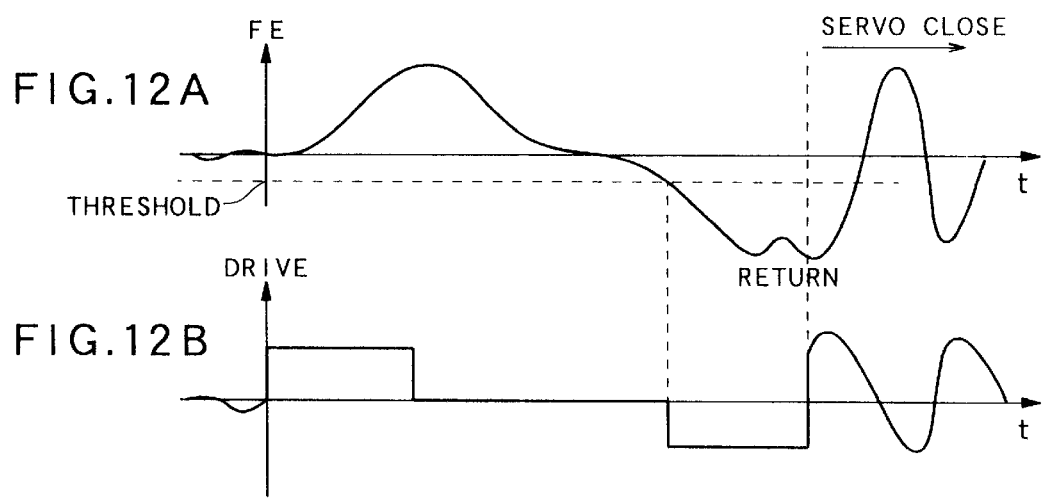
FIG.12A
FIG.12B

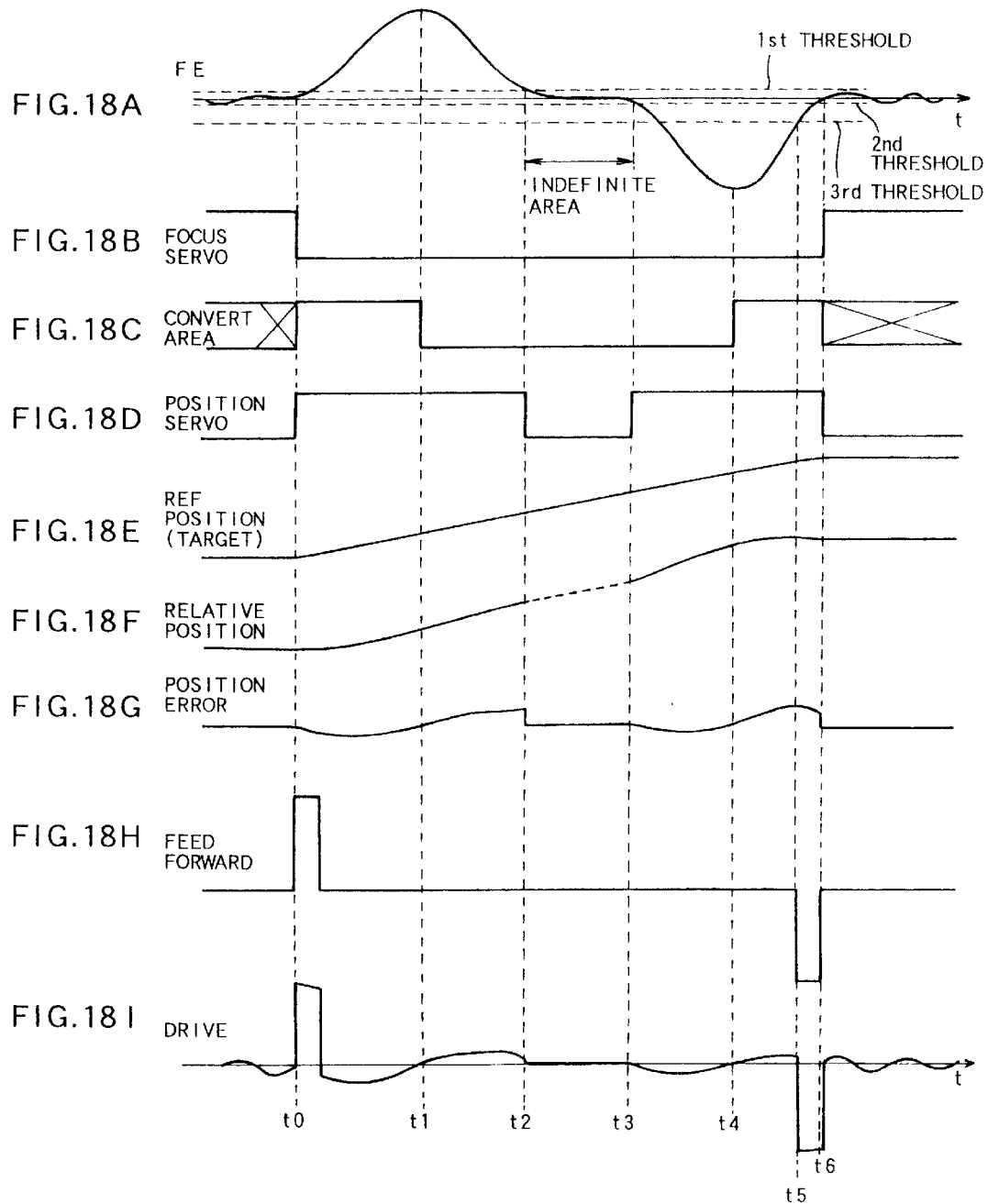

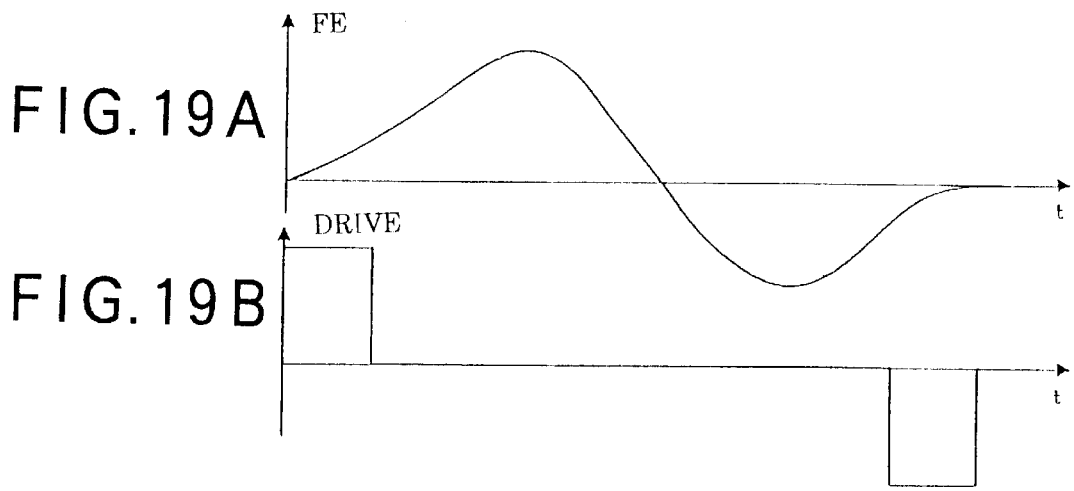
FIG. 19A
FIG. 19B
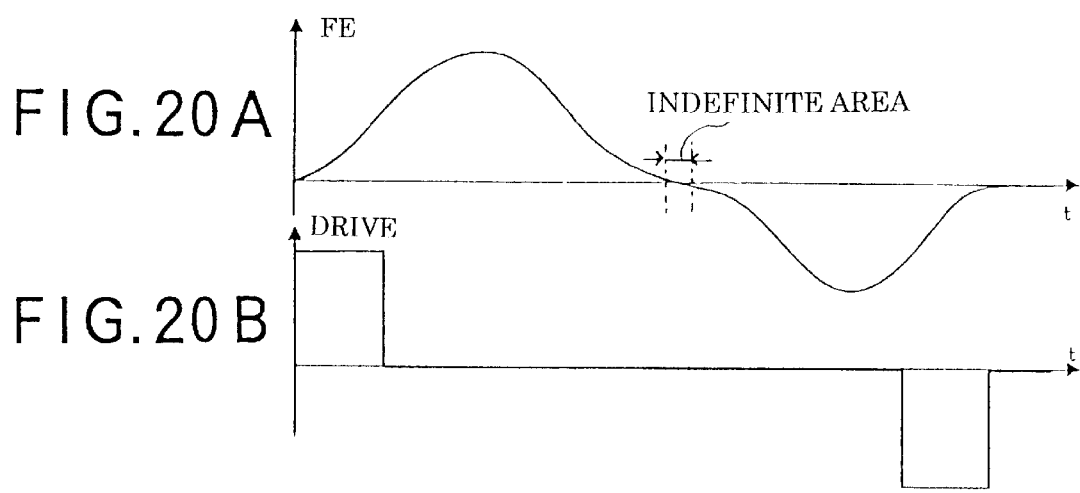
FIG. 20A
FIG. 20B

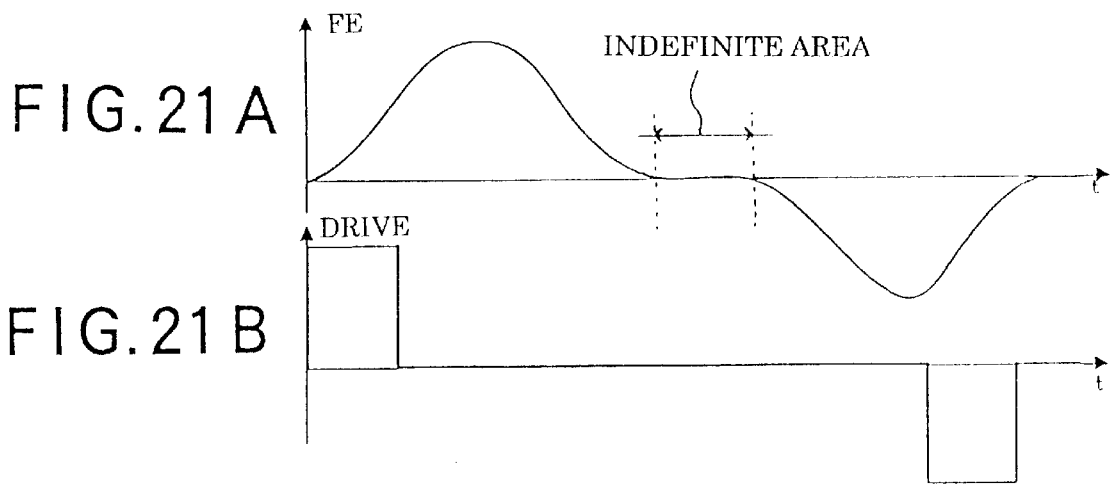
FIG. 21A
FIG. 21B
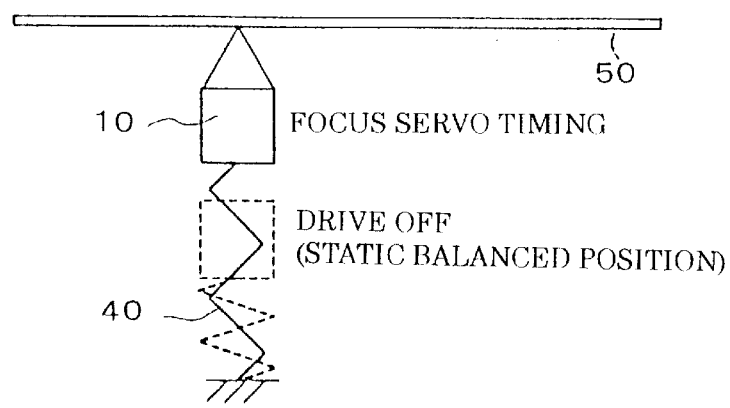
FIG. 22

FOCUS JUMP DEVICE FOR REPRODUCING INFORMATION FROM A STORAGE MEDIUM

BACKGROUND OF THE INVENTION

1. Field of the Invention

The present invention relates to a focus jump device for jumping between recording layers in a storage medium, such as an optical disc, having at least two recording layers.

2. Description of Related Art

In a conventional optical disc reproduction apparatus such as a Compact Disc player, a focus servo control is performed as follows. First, a predetermined drive signal of a sawtooth waveform, for example, is supplied to a drive circuit of an actuator, and then the drive circuit applies an output corresponding to the drive signal to a focus coil provided in the actuator. Thus, the actuator moves toward or away from the disc. Then, a laser beam is irradiated on the optical disc by the objective lens of the actuator, and the light reflected by the optical disc is converted into an electric signal by the photodetector to produce a focus error signal. The focus error signal has a zero-level output when the relative distance between the objective lens and the disc is equal to a reference value, and has an S-shaped characteristic in which the output level continuously varies dependently upon the displacement from the reference distance. The focus error signal thus produced is compared with the reference value, and the comparison result is inputted to the servo loop control unit as a positional error. The servo loop control unit recognizes the zero-crossing point of the focus error signal from the inputted positional error, and inputs the focus error signal to the drive circuit of the actuator when the focus sum signal, indicating the total quantity of the reflected light, is larger than a given level and the focus error signal is at the zero-crossing point. Thus, the focus servo loop is established by the actuator, the photodetector and the drive circuit of the actuator. When the focus servo loop is established, the focus error signal is subjected to the phase compensation by the equalizer amplifier, and then inputted to the drive circuit of the actuator. The drive circuit of the actuator outputs the drive signal to the actuator, based on the inputted focus error signal, to drive the objective lens such that the relative distance between the objective lens and the optical disc is always equal to the reference value. In this way, in a conventional CD player, the pickup is driven by the focus coil to constantly maintain the relative distance between the objective lens and the optical disc to be constant.

Recently, a disc having a multi-layer structure including a first reflective layer and a second reflective layer to achieve high density recording has been put into practice along with the increase of the recording information on an optical disc. In reproducing such an optical disc having multi-layer structure, the focus servo control should be reliably performed for the reproduction layer from which recorded information is to be read out, when the reproduction layer is changed from one to another. For example, in order to change the reproduction layer from the first reproduction layer to the second reproduction layer during the reproduction, the actuator should be jumped to move the focused beam spot from the first reproduction layer to the second reproduction layer. The interlayer jump of the beam spot like this is generally called as "focus jump". Specifically, the focus jump is performed as follows. In response to the jump start command, an acceleration pulse of a constant amount is applied to the drive circuit of the actuator, and a deceleration pulse of a constant amount is then applied to the drive circuit at a desired timing. By this, an open control of feed-forward type is carried out, and then the above described focus servo control is resumed after the objective lens reaches the target position. The target value of the focus servo is zero, and the detection system shows a linear characteristic when the focus error stays around zero at the focus servo closing timing. However, the output of the detector shows non-linear characteristic such as a sinusoidal waveform when the interlayer jump (i.e., focus jump) is performed. Therefore, conventionally, the feedback control for stabilization is not performed during the, focus jump period.

However, the open control of the feed-forward type is susceptible to external disturbance. For example, the control may be unstable due to the vibration of the disc surface at the time of the focus jump, or variation of the interlayer spacing. Further, the servo may not be quickly set at the time of closing the focus servo after the focus jump, or the focus servo may lose control, thus leading to the deterioration of performance.

SUMMARY OF THE INVENTION

It is an object of the present invention to provide a focus jump device which performs stable focus jump even if external disturbance such as the vibration of the disc surface or variation of the interlayer spacing exists.

According to one aspect of the present invention, there is provided a focus jump device, adapted to be used in an information reproduction apparatus for reproducing information from a storage medium having at least two recording layers or used in an information recording apparatus for recording information onto the storage medium, which moves a focus position of a light beam in a direction perpendicular to the storage medium to the focus position corresponding to a target recording layer so that the light beam is irradiated on the target recording layer, the device including: a focus position moving unit for moving the focus position of the light beam; a focus error signal detector for detecting a focus error signal based on a variation of a returning light from the storage medium, the variation of the returning light being based on a variation of the focus position of the light beam with respect to the recording layer; a feedforward controller for supplying a drive signal to the focus position moving unit to move the focus position of the light beam in an acceleration state in an acceleration control and to move the focus position of the light beam in a deceleration state in a deceleration control; and a position controller for comparing the focus error signal, which is detected by the focus error signal detector at the time of movement of the focus position of the light beam to the target recording layer triggered by the acceleration control, with a predetermined target value to generate an error, and for feeding back the drive signal to the focus position moving unit to reduce the error thereby to control the focus position of the light beam.

In accordance with the focus jump device thus configured, when the jump instruction is outputted by an external controller or else, the feedforward controller conducts on the focus position moving unit. By this, the focus position of the light beam gradually starts moving, and the relative distance between the focus position of the light beam and the recording layer varies. In addition, by this variation, the returning light from the storage medium also varies, and this variation is detected by the focus error signal detector as the focus error signal. The focus error signal thus detected is compared with a predetermined target value to obtain an error therebetween, and a drive signal is fed back to the focus position moving unit such that the position controller reduces the error, thereby to perform the focus position control of the light beam. On the other hand, after the acceleration control, the feedforward controller performs the deceleration control at the given timing so that the focus position of the light beam reaches the target position of the recording layer. Thus, according to the present invention, with the aid of the feedforward control, the focus position of the light beam is securely moved according to the movement distance between the recording layers, which is longer than the movement distance in the focus servo control. In addition, the focus error signal, serving as a position information corresponding to the movement, is controlled to follow the given target value by the feedback control, and hence the focus jump is resistant to the external disturbance. As a result, the convergence of the focus servo after the focus jump is accelerated.

The feedforward controller may perform a constant speed control for a predetermined time period between the acceleration control and the deceleration control. If the feedback control is performed by the position controller during the constant speed period, the apparent frequency band is lowered, and stable servo loop is established. As a result, the focus position of the light beam can follow the given target value with high accuracy. When the feedforward controller performs the deceleration control after the constant speed period, the focus position of the light beam accurately reaches the target recording layer. Thus, highly accurate focus jump can be performed and the focus servo can rapidly converge after the focus jump.

The time period of the constant speed control may be set to be longer than the time periods of the acceleration control and the deceleration control. By this, the feedback control for the focus position of the light beam is effectively performed, and hence highly accurate focus jump can be achieved.

In a preferred embodiment, the feedforward controller may perform a constant speed control in which no pulse is applied to the focus position moving unit after the acceleration control in which at least one acceleration pulse is applied to the focus position moving unit, and may perform the deceleration control in which at least one deceleration pulse is applied to the focus position moving unit after a completion of the constant speed control. By this, since a sufficient constant speed period is provided between the initial acceleration pulse and the last deceleration pulse, the feedback function for the focus position of the light beam can be effective, thereby achieving the accurate focus jump.

In another preferred embodiment, the feedforward controller may perform the deceleration control in which a plurality of deceleration pulses are applied to the focus position moving unit stepwise after the acceleration control in which at least one acceleration pulse is applied to the focus position moving unit, and may perform a constant speed control in which no pulse is applied to the focus position moving unit in a time period between the acceleration pulse and the deceleration pulse and time periods between the deceleration pulses. Thus, the focus position of the light beam moves to the position close to the target recording layer at first, and then accurately reaches the target position with gradually decelerating. As a result, the highly accurate control can be performed and the focus servo can be quickly converged after the focus jump.

In still another preferred embodiment, the feedforward controller may perform the deceleration control in which at least one deceleration pulse is applied to the focus position moving unit after the acceleration control in which a plurality of acceleration pulses are applied to the focus position moving unit stepwise, and may perform a constant speed control in which no pulse is applied to the focus position moving unit in time periods between the acceleration pulses and in a time period between the acceleration pulse and the deceleration pulse. Thus, the focus position of the light beam gradually starts moving. Therefore, the influence by the surface vibration of the storage medium can be securely removed, and accurate focus jump can be achieved. In addition, the control is effective from the start of the focus jump, and the variation of the initial condition of the focus jump can be suppressed.

In still another preferred embodiment, the feedforward controller may include a plurality of application patterns of acceleration pulse and deceleration pulse for the acceleration control and the deceleration control, and may select the application pattern in accordance with a jumping distance. Since the application pattern of the pulse is selected according to the focus jump distance, the stable focus jump can be achieved regardless of the jump distance, and the required jumping time period can be shortened.

The feedforward controller may include a profile setting unit for setting a profile indicating a variation of the focus position of the light beam according to a passage of time, and a feedforward compensator may have a transfer function reverse to a transfer function of the focus position moving unit. The profile setting unit may set a profile including at least one focus position variation in a constant speed state between the focus position variation in the acceleration state from a start of a focus position movement and the focus position variation in the deceleration state up to an end of the focus position movement, and the feedforward compensator may apply a feedforward signal, which compensates for the profile, to the focus position moving unit. Therefore, the feedback control is performed in parallel with the feedforward control thereby to achieve accurate focus jump. In addition, the profile can be readily changed to freely control the feature of the position variation of the focus position.

The device may further include a linearizing converter for linearizing the focus error signal, and a reference position setting unit for setting a reference position indicating the focus position variation according to a passage of time. The feedforward controller may compare an output value of the linearizing converter with the reference position to an error therebetween, and may supply the drive signal to the focus position moving unit to reduce the error. Thus, the apparent frequency band in the feedback control is lowered. Hence, the focus position reaches the target position with high accuracy, and the focus servo rapidly converges after the completion of the focus jump.

The device may further include a linearizing converter for linearizing the focus error signal, wherein the feedforward controller uses the profile set by the profile setting unit as a reference position serving as the predetermined target value, compares an output value of the linearizing converter with the reference position to obtain an error therebetween, and supplies the drive signal to the focus position moving unit to reduce the error. Therefore, the apparent frequency band in the feedback control is lowered, and the focus position of the light beam follows the reference position. Thus, the focus position of the light beam can accurately reach the target position on the recording layer, and the focus servo can rapidly converge. In addition, the overall configuration can be simplified by the common use of the reference position setting unit and the profile setting unit.

The device may further include an area discriminator for discriminating whether the focus error signal detected by the focus error signal detector belongs to a first area in which the focus error signal is increasing or a second area in which the focus error signal is decreasing, wherein the linearizing converter includes a plurality of different conversion tables for different areas and selects the conversion table based on a discrimination result by the area discriminator thereby to linearize the focus error signal. Thus, the non-linear focus error signal is appropriately linearized. As a result, suitable feedback control can be achieved, the focus position of the light beam reaches the target position with high accuracy, and the focus servo can rapidly converge after the focus jump.

The device may further include a detection method discriminator for discriminating a detection method of the focus error signal, wherein the linearizing converter includes a plurality of different conversion tables for different areas for different detection methods, and wherein the linearizing converter selects the plurality of different conversion tables based on a discrimination result by the detection method discriminator and then selects the conversion table based on a discrimination result by the area discriminator thereby to linearize the focus error signal. Therefore, the linearization of the focus error signal is appropriately performed even if focus error signals of different waveforms are obtained, and appropriate feedforward and feedback controls are performed to achieve accurate focus jump.

The area discriminator may discriminate whether the focus error signal detected by the focus error signal detector belongs to a first area in which the focus error signal is an increasing positive value or a decreasing negative value, or a second area in which the focus error signal is increasing or decreasing, or a third area in which the focus error signal is increasing negative value or a decreasing positive value. Thus, non-linear focus error signal can be appropriately linearized. In addition, the feedforward and feedback controls are performed to achieve accurate focus jump.

In a preferred embodiment, the area discriminator may discriminate the area based on a timing at which the focus error signal reaches a positive or a negative peak value. Thus, the areas are accurately discriminated and the linearization is performed by using the appropriate conversion table.

The area discriminator may discriminate the area based on a quantity of the light beam returning from the storage medium. Therefore, the linearization is performed by using the appropriate conversion table.

The reference position may include a focus position variation at least one focus position variation in the constant speed state between an acceleration state from a start of the focus position movement and a deceleration state up to an end of the focus position movement. Therefore, the frequency band in the feedback control is lowered, and accurate focus jump can be performed with the stable feedback loop.

If there is a constant time period in which the focus error signal or a quantity of the light beam returning from the storage medium is smaller than a predetermined threshold and is substantially constant, the feedforward controller may perform the feedforward control in a time period other than the constant time period. Therefore, highly accurate feedback control is performed to achieve accurate focus jump.

The device may further include a focus servo controller for performing the focus position control of the light beam by feeding back a drive signal to the focus position moving unit such that the focus error signal becomes zero after the focus jump is finished, and each of the feedforward controller and the focus servo controller includes a phase compensator corresponding to its own control characteristic. Therefore, the appropriate controls are performed in different frequency bands.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 6 is an explanatory graph for comparing a focus error signal referencing method at the time of focus servo control with the focus error signal referencing method at the time of the focus jump.

FIGS. 11A and 11B are waveform diagrams for explaining the focus jump control of a comparative example which is compared with the focus jump device of the present invention, wherein FIG. 11A shows a focus error signal and FIG. 11B shows a drive signal to be applied to an actuator.

FIGS. 12A and 12B are waveform diagrams for explaining the focus jump control of a comparative example to be compared with the focus jump device of the present invention, wherein FIG. 12A shows a focus error signal and FIG. 12B shows a drive signal to be applied to an actuator.

FIGS. 18A to 18I are timing charts showing the result of the experiment performed using the focus jump device shown in FIG. 17, wherein FIG. 18A shows a focus error signal, FIG. 18B shows an open/close switching signal of a focus servo, FIG. 18C is a conversion area signal indicating switching of focus error signal areas, FIG. 18D is an ON/OF switching signal of a positional servo in indefinite areas and other areas in the focus error signal, FIG. 18E shows a reference position, FIG. 18F shows a relative position corresponding to the target recording layer of an objective lens obtained by the linearizing conversion of the focus error signal, FIG. 18G shows positional error of the reference position and relative position, FIG. 18H shows a feedforward output to be applied to an actuator, and FIG. 18I shows a drive signal to be applied to the actuator.

FIGS. 19A and 19B are diagrams for explaining indefinite areas of the focus error signal, wherein FIG. 19A shows the focus error signal when the capture range is large and FIG. 19B shows the feedforward output.

FIGS. 20A and 20B are diagrams for explaining indefinite areas of the focus error signal, wherein FIG. 20A shows the focus error signal when the capture range is medium size and FIG. 19B shows the feedforward output.

FIGS. 21A and 21B are diagrams for explaining indefinite areas of the focus error signal, wherein FIG. 21A shows the focus error signal when the capture range is small and FIG. 21B shows the feedforward output.

FIG. 22 is a diagram showing a schematic configuration of the actuator of the focus jump device shown in FIG. 17.

FIGS. 23A and 23B are diagrams for explaining a drive signal including offset, wherein FIG. 23A shows the focus error signal and FIG. 23B shows the feedforward output including offset.

DETAILED DESCRIPTION OF THE PREFERRED EMBODIMENTS

The preferred embodiments of the present invention will now be described below with reference to the attached drawings.

[1] 1st Embodiment

Figure 1:
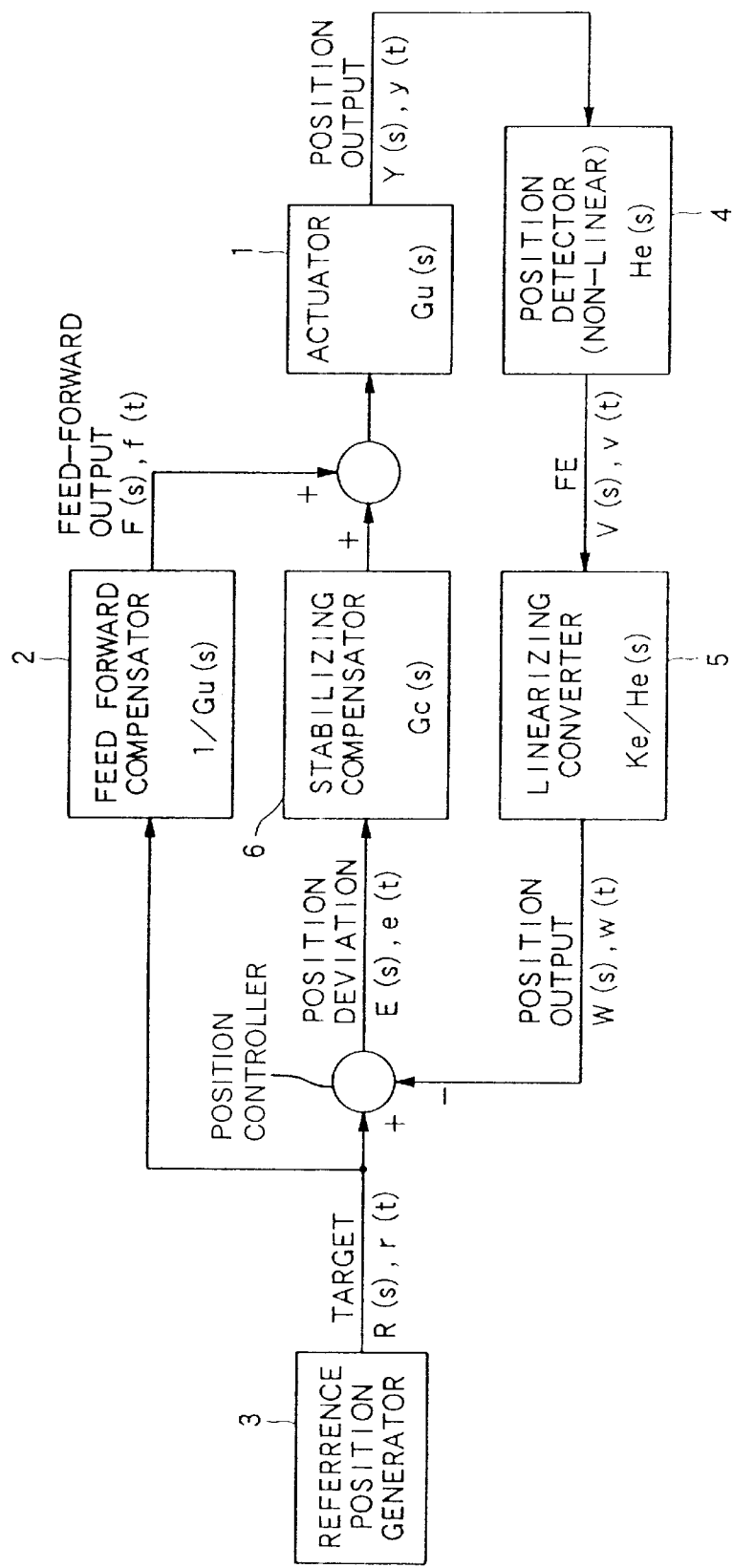
FIG. 1 is a block diagram showing a configuration of a focus jump device according to the first embodiment of the present invention.

The first embodiment of the present invention will be described with reference to FIGS. 1 to 23. FIG. 1 is a block diagram showing a configuration of a focus jump device of the first embodiment.

The focus jump device of the first embodiment is suitably employed in a reproduction apparatus for DVD having a signal recording layer of double layer structure and the signal is reproducible from only one side thereof, or a recording and/or reproduction apparatus for DVD having a signal recording layer of double layer structure and the signal is recordable on and/or reproducible from only one side thereof. The DVD has two base laysers affixed to each other, each having a signal recording layer, wherein the first layer forms a semi-transparent film and the second layer forms a reflective film. The laser beam is irradiated from one side, and the signal recorded on the first layer is reproduced by the reflected light from the semi-transparent layer. Also, the laser light passes through the semi-transparent film, and the signal recorded on the second layer is reproduced by the reflected light from the reflective film. Each base layer has a thickness of 0.55 to 0.64 mm, and a spacer having a thickness of 55±15 $\mu$m is provided between the first layer and the second layer. Therefore, the signal can be recorded on and reproduced from two layers by moving the laser aperture position up and down for the distance corresponding to the thickness of the spacer. The focus jump device of this embodiment accurately performs the jump of the objective lens, so-called "focus jump", for moving the laser beam spot from the first layer to the second layer, and vice versa.

As shown in FIG. 1, the focus jump device of this embodiment includes an actuator 1, a feed forward compensator 2, a reference position generator 3, a position detector 4, a linearizing converter 5, and a stabilizing compensator 6. The actuator 1 serves as a controlled element. The feed forward compensator 2 supplies the feed forward signal to the actuator 1 as a control input. The reference position generator 3 supplies the target value, and the position detector 4 detects the positional output indicating the behavior of the actuator 1 as the controlled variable. The linearizing converter 5 applies linear-conversion onto the focus error signal outputted by the position detector 4 and feeds back the resultant signal as the linearized positional output. The stabilizing compensator 6 supplies the drive signal as the control input, which makes the behavior of the actuator 1 to coincide with the target value, based on the positional error induced between the target value supplied by the reference position generator 3 and the linearized positional output thus fed back. The respective components will be described below in more detail.

(1) Actuator

Figure 2:
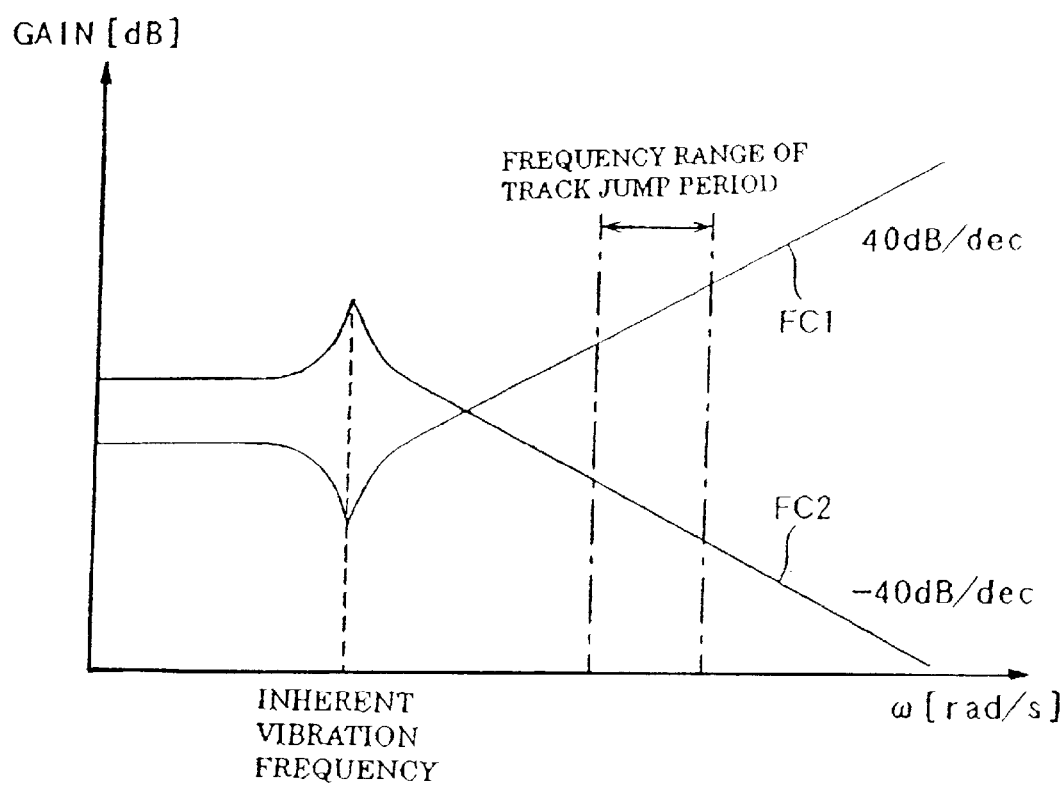
FIG. 2 is a graph showing frequency characteristics of an actuator and a feedforward compensator in the focus jump device shown in FIG. 1.
Figure 3:
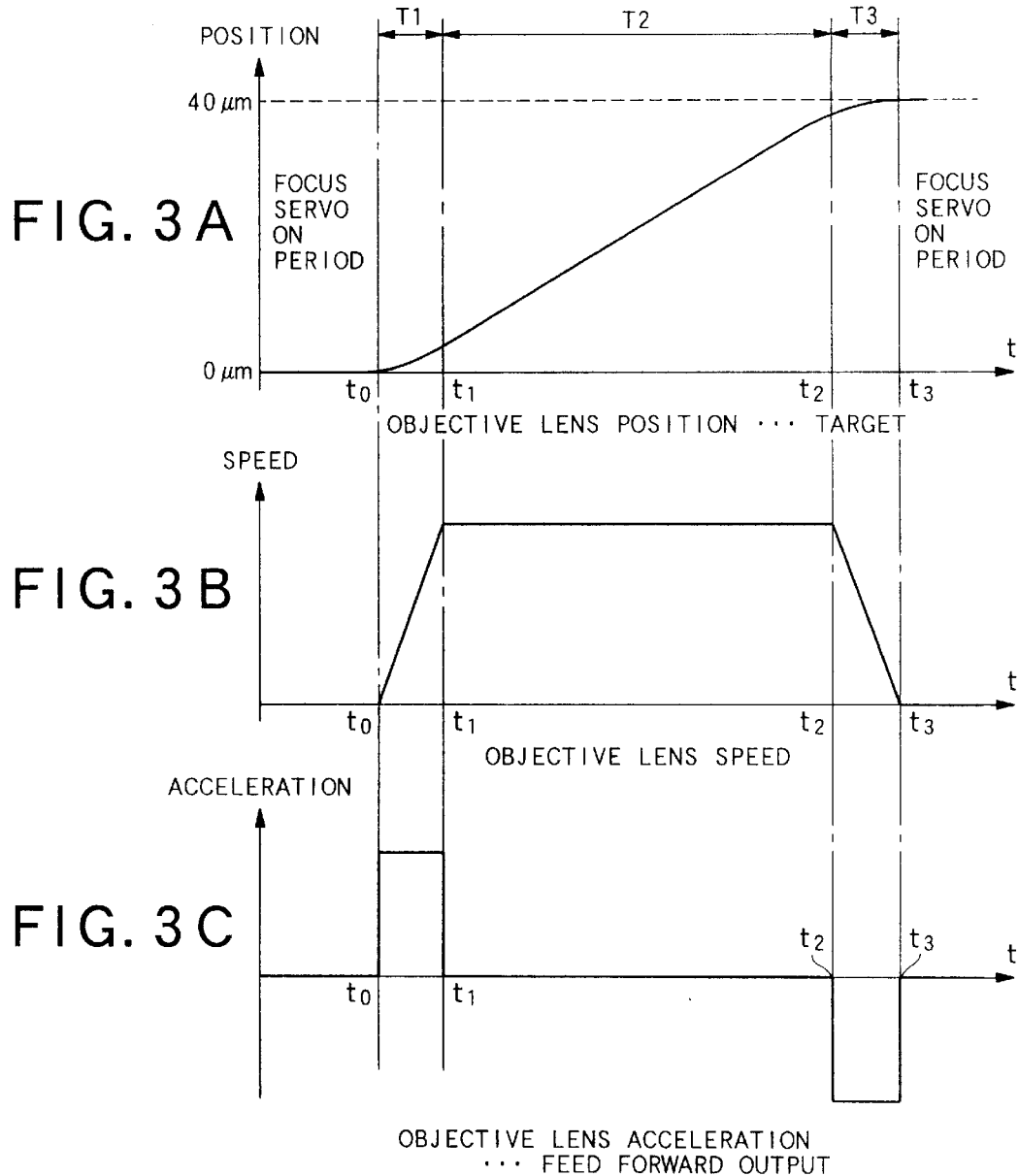
FIG. 3A is a graph showing a profile outputted by a reference position generator in the first embodiment.
FIG. 3B is a graph showing the speed change obtained by the first-order differentiation of the profiled shown in FIG. 3A.
FIG. 3C is a graph showing the feedforward output obtained by the second-order differentiation of the profiled shown in FIG. 3A.

The actuator 1 moves the objective lens of the optical pickup in a direction perpendicular to DVD based on the feed forward output from the feed forward compensator 2 or the drive signal from the stabilizing compensator 6. The actuator 1 has a frequency characteristic FC2 as shown in FIG. 2. The time required for the focus jump is less than 1 msec, which is equivalent to some kHz and is at the position higher than the natural vibration frequency (shown in FIG. 2 by the "FOCUS JUMP BAND"). Within the focus jump band, the actuator 1 has the frequency characteristic FC2 having a slope of −40 dB/dec.

(2) Feedforward Compensator

The feedforward compensator 2 supplies the feedforward output F(s), f(t), serving as a control input, to the actuator 1 to make the behavior of the actuator 1 coincide with the target value.

Supposing that the positional output of the actuator 1 is Y(s), the transfer function of the actuator 1 is Gu(s), the transfer function of the feedforward compensator 2 is Gf(s), and the target value is R(s), the following equation stands:

$$Y(s)=Gu(s)\cdot Gf(s)\cdot R(s)$$

Therefore, in order to make the positional output of the actuator 1 coincide with the target value, $$Y(s)/R(s)=1=Gu(s)\cdot Gf(s)$$

should be satisfied. Eventually, the transfer function G(f) of the feedforward compensator 2 becomes $$Gf(s)=1/Gu(s)$$

Thus, it turns out that the transfer function Gf (s) of the feedforward compensator 2 should be the inverse function of the transfer function of the actuator 1. FIG. 2 shows the frequency characteristic FC1 of the feedforward compensator 2 having the transfer function 1/Gu(s). As seen in FIG. 2, it is recognized that the frequency characteristic of the feedforward compensator 2 has the slope of 40 dB/dec and may be approximated as a characteristic of a second order differentiator.

(3) Reference Position Generator

The reference position generator 3 outputs the target value R(s)(,r(t)). Since the controlled variable of the actuator 1 serving as the controlled component is the positional output, i.e., the moving distance varying on the time axis, the target value R(s)(,r(t)) should also be given as a moving distance varying on the time axis. In this embodiment, the reference generator 3 outputs the profile as shown in FIG. 3A, for example, as the target value R(s)(,r(t)). In this profile, the position of the current signal recording layer (0 μm) is the starting position, and the moving distance increases in the period from the timing T0 to T1 like a quadratic function, then increases in the period T2 as a linear function, then decreases like a quadratic function in the period T3, and reaches the position of 40 μm (i.e., interlayer distance) away at the timing t3. FIG. 3B shows the speed variation obtained by applying the first order differentiation on the profile shown in FIG. 3A. Namely, the period T1 is an acceleration period, the period T2 is a constant speed period, and the period T3 is a deceleration period.

Further,, the feedforward compensator 2 may be approximated to a second order differentiator as described above. When the second order differentiation is applied to the profile shown in FIG. 3B, as shown in FIG. 3C, the acceleration pulse having the width T1 is outputted at the timing t0 and the deceleration pulse having the width of T3 is outputted at the timing t2 which is after the time period T2 from the timing t1. In this embodiment, the profile shown in FIG. 3A is supplied to the feedforward compensator 2 as the target value, and the feedforward compensator 2 outputs the feedforward output F(s), f(t) having a constant period between the acceleration pulse and the deceleration pulse as shown in FIG. 3C.

In this embodiment, the transfer function Gf(s) of the feedforward compensator 2 is approximated to that of the second order differentiator and the above profile is used as the target value R(s). Thereby, the acceleration pulse (period T1) and the deceleration pulse (period T3) are applied as the feedforward output f(t). However, the present invention is not limited to this particular feature. For example, a feedforward output F(s) other than the pulse waveform may be applied by calculating the target value R(s) (,r(t)) and the transfer function Gf(s) of the feedforward compensator 2 for the profile other than the above mentioned one.

(4) Position Detector

Figure 4:
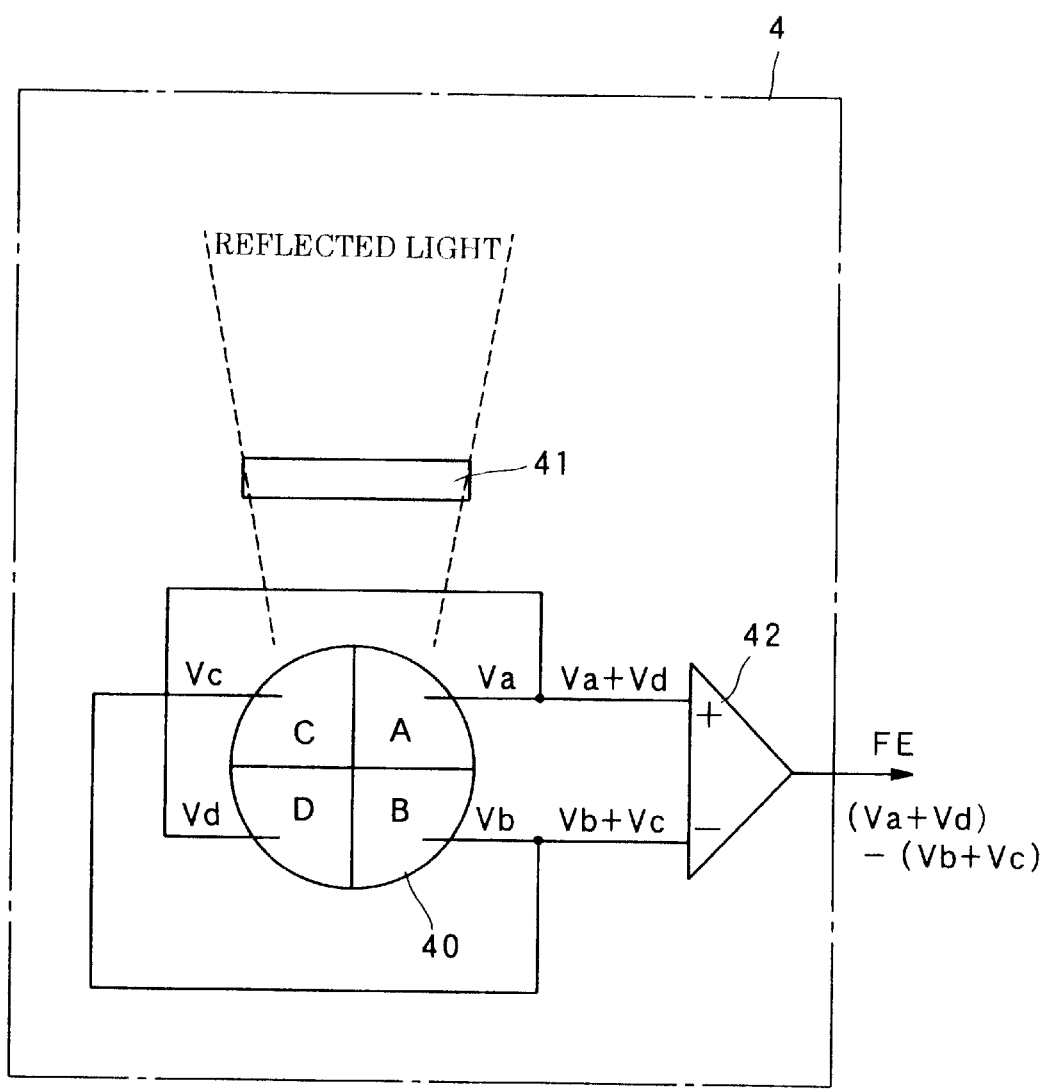
FIG. 4 is a diagram showing the schematic configuration of a position detector in the focus jump device shown in FIG. 1.

The position detector 4 detects the positional output which is information of the position varying according to the movement of the actuator 1 as a variation of the actual signal, and may be configured as shown in FIG. 4, for example. The position detector 4 shown in FIG. 4 includes a four-divided light receiving element 40, an astigmatism generator 41, and a differential amplifier 42.

Figure 5A:
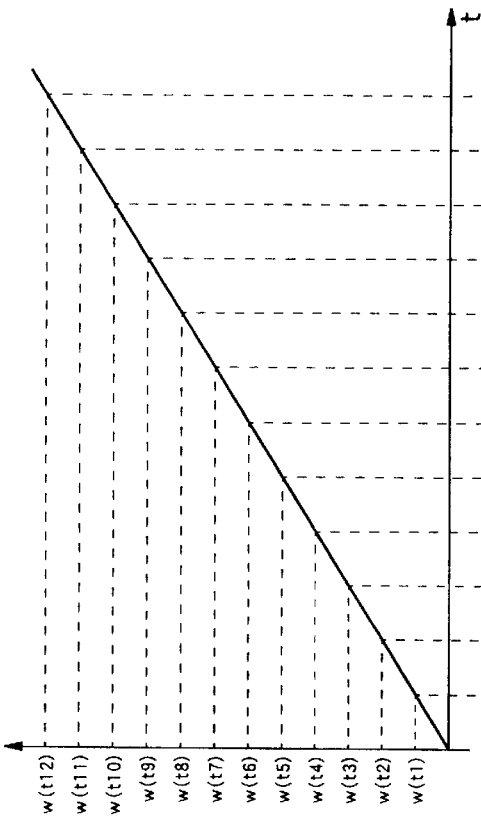
FIG. 5A is a graph showing a linearized positional output obtained by the linearizing conversion of a focus error signal by a linearizing converter of the focus jump device shown in FIG. 1.
Figure 5B:
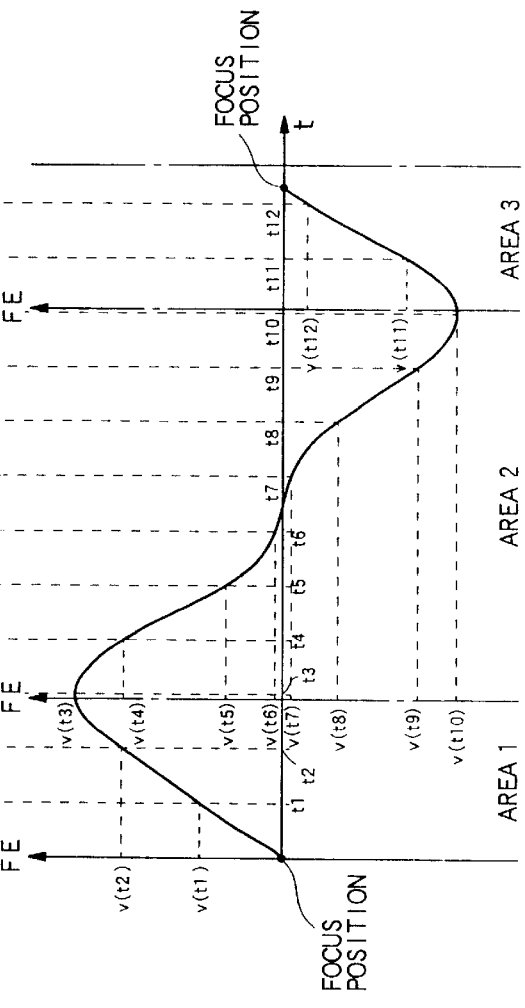
FIG. 5B is a graph showing a focus error signal obtained by the position detector of the focus jump device shown in FIG. 1.

The reflected light from the signal recording layer passes through the astigmatism, generator 41 to be incident upon the four-divided light receiving element 40. The outputs of the diagonally-positioned portions of the element 40 are added to each other (i.e., Va+Vs, Vb+Vc), and the difference of those sums is generated by the differential amplifier 42. Thus, the focus error signal according to the astigmatism method is obtained as shown in FIG. 5B. It is noted that the focus error signal generation method usable in this invention is not limited to this, and other methods such as the spot-size method or the knife-edge method may also be used.

FIG. 5B shows an exemplary waveform of a focus error signal when the actuator 1 moves at a constant speed and the relative position of the signal recording surface and the objective lens varies at a constant rate. As seen in FIG. 5B, the focus error signal has a positive value and is increasing in the AREA1, and is decreasing to a negative value in the AREA2. Then, the focus error signal again increases in the AREA 3. The focus error signal has a positive peak at the border of the AREA1 and the AREA2, and has a negative peak at the border of the AREA2 and the AREA3. The focus error signal shows the zero-crossing points at the focused position of two layers and the intermediate position of two layers. At the time of focus servo, a focus error signal of so-called S-shape curve is generally obtained. The focus error signal in the focus jump shows a curve which is a connection of a positive value portion of the focus error signal at the time of focus servo in the first layer and a negative value portion of the focus error signal at the time of focus servo in the second layer. It is noted that the polarity of the focus error signal varies dependently upon the generation method thereof, and may be of a reverse polarity to that shown in FIG. 5B.

Although the focus error signal is a non-linear signal, in view of the respective areas; the focus error signal varies either one of the increasing or decreasing direction according to the passage of time. Accordingly, the focus error signal values v(t1) and v(t2) in the AREA1 correspond to the relative positional values w(t1) and w(t2) of the signal recording layer and the objective lens, respectively. The focus error signal values v(t3) to v(t10) in the AREA2 correspond to the relative positional values w(t3) to w(t10) of the signal recording layer and the objective lens, respectively. The focus error signal values v(t11) and v(t12) in the AREA3 correspond to the relative positional values w(t11) and w(t12) of the signal recording layer and the objective lens, respectively. Thus, with discriminating the areas, the focus error signal can be used as a signal indicating the positional output of the actuator 1.

(5) Linearizing Converter

The linearizing converter 5 applies the linearizing conversion on the focus error signal outputted by the position detector 4. The linearizing converter 5 converts the non-linear focus signal shown in 5B into a linear signal shown in FIG. 5A, for example.

Generally, in the focus servo control, the focus error signal is used as a signal indicating the error of the objective lens position from the focus position. Since the servo control is carried out using the area, which can be approximated as a linear signal from AREA3 to AREA1, as the capture range, the linearizing conversion is not applied. However, in this embodiment, the focus error signal is used as a signal indicating the relative position (positional relation) of the objective lens and the recording surface from the focusing position for the current recording layer to the focus position for the next recording layer. In addition, the feedback loop is established to reduce the variation between the signal indicating the relative position and the above mentioned profile used as the reference position. Therefore, the focus error signal should be referred to at any positions in all three areas AREA1, AREA2 and AREA3, and hence the feedback control is difficult perform with using such a non-linear signal. Namely, for example, the feedback control is required at high frequency band if the focus error signal value varies in a quadratic function manner like as the area from the focus error value v(t2) to the positive peak or the area from the negative peak to the focus error value v(t11), as shown in FIG. 5B. In addition, since the polarity of the focus error signal reverses within the AREA2 as shown in FIG. 5B, the performance of the feedback loop is disturbed. Therefore, the linearizing converter 5 is introduced in this invention to covert the non-linear focus error signal to the signal which is linear over all areas, thereby to establish the servo loop stable during the focus jump.

Figure 7:
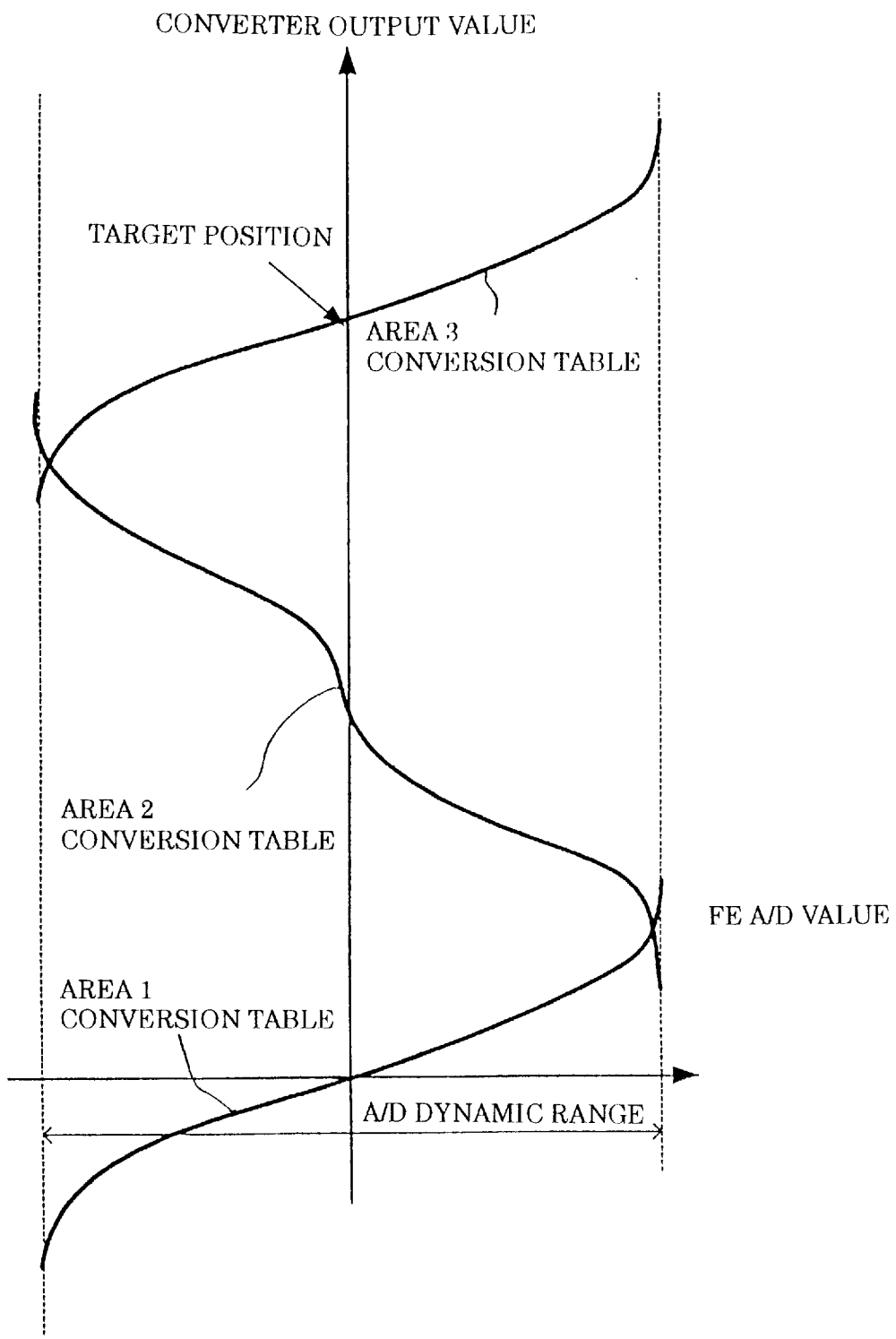
FIG. 7 is a graphic illustration of a table for linearizing conversion used in the linearizing converter of the focus jump device shown in FIG. 1.
Figure 8:
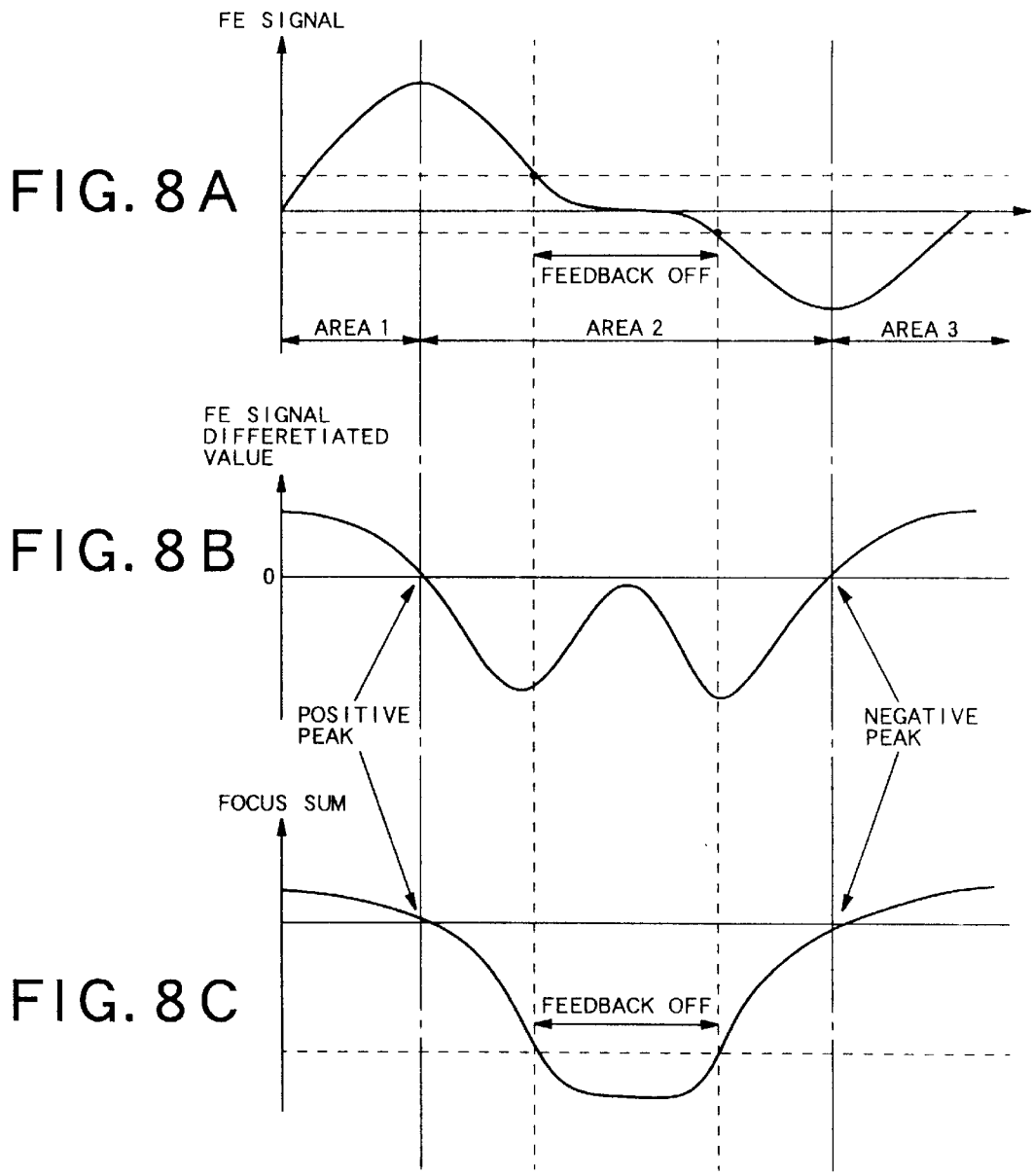
FIG. 8A is a graph showing the focus error signal detected by the focus jump device shown in FIG. 1.
FIG. 8B is a graph showing a relation between the differentiated version waveform of the focus error signal and areas.
FIG. 8C is a graph showing a relation between a focus sum and areas.
Figure 9:
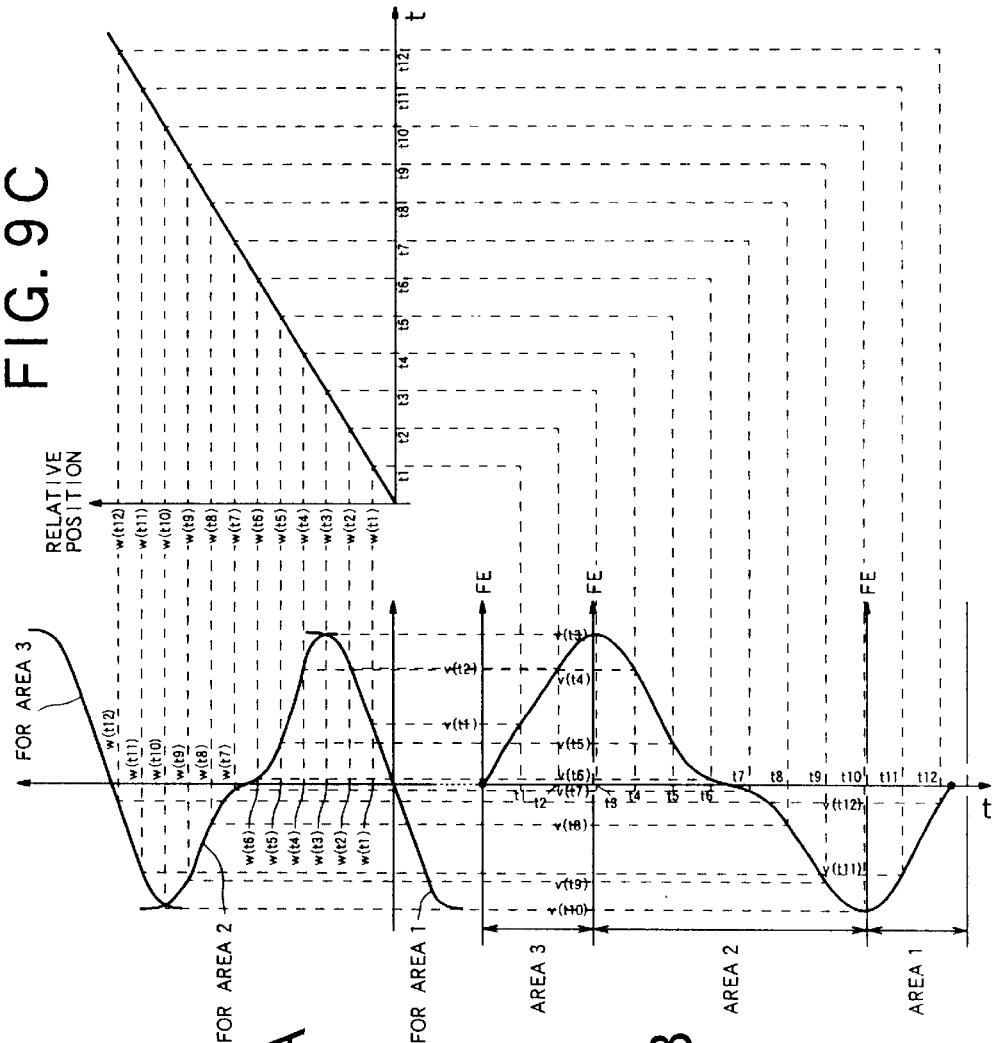
FIG. 9A is a graphic illustration of a table shown in FIG. 7.
FIG. 9B is a graph showing the focus error signal inputted to the linearizing converter.
FIG. 9C is a graph showing the linearized positional output obtained by linearizing the focus error signal shown in FIG. 9B.

There are many methods for the linearizing conversion. One example uses DSP (Digital Signal Processing) which refers to a table as shown in FIG. 7 to output converted outputs. The table shown in FIG. 7 includes the tables for the conversion in the AREA1, AREA2 and AREA3 because the focus error signal can be divided into three areas AREA1, AREA2 and AREA3 in view of its magnitude and polarity. In the AREA1, the focus error signal has a positive value, and the signal magnitude increases according to the passage of time. In the AREA2, the focus error signal changes from a positive value to a negative value according to the passage of time, and the signal magnitude degreases and then increases again. In the AREA3, the focus error signal has a negative value, and the signal magnitude increases according to the passage of time. In order to linearize the above mentioned focus error signal, the conversion tables for the AREA1 and AREA3 have such a polarity characteristic as to output the converted output increasing according to the increase of the focus error value, and the conversion table for the AREA2 has such a polarity characteristics as to output the converted output increasing according to the decrease of the focus error value. In addition, the conversion table for the AREA2 has an offset value larger than that of the conversion table for the AREA1, and the conversion table for the AREA3 is has an offset value larger than that of the conversion table for the AREA2. Further, the gain correction amount is increased or decreased according to the decrease or increase of the varying amount of the focus error signal for the portions in each areas where the focus error signal varies in the quadratic function manner.

As the method of switching the area, there are a method of switching the area by using the peak value of the focus error signal as the reference and another method of switching the area by using the threshold value of the focus sum signal, which indicates the total sum of the reflected light quantity, as the reference. Further, another method is conceivable in which the envelop of the reproduced RF signal is detected and compared with a predetermined threshold to switch the area. For example, when the focus error signal shown in FIG. 8A is differentiated, the signal having the waveform shown in FIG. 8B is obtained. In the signal shown in FIG. 8B, the positive peak of the focus error signal is obtained at the position where the signal shown in FIG. 8B crosses zero during its transition from the positive value to the negative value, and the negative peak of the focus error signal is obtained at the position where the signal shown in FIG. 8B crosses zero during its transition from the negative value to the positive value. The position where the positive peak is obtained is the border of the AREA1 and AREA2, and the position where the negative peak is obtained is the border of the AREA2 and AREA3. Therefore, the area can be switched by using a peak detector or a level detector, or by detecting the peak of the focus error signal from the polarity of the slope of the focus error signal being sampled.

If the focus sum, which is a total sum of the reflected light quantity, is detected when the focus error signal shown in FIG. 8A is detected, the waveform shown in FIG. 8C is obtained. As shown in FIG. 8C, the focus sum passes by a given threshold in either the decreasing or increasing direction at the borders of the areas. The focus sum passes by the given threshold in the decreasing direction at the border of the AREA1 and AREA2, and passes by the given threshold in the increasing direction at the border of the AREA2 and AREA3. Therefore, the area can be switched by detecting the total sum of the returning light quantity detected by the photodetector to obtain the focus sum and then comparing the focus sum thus obtained with the given threshold.

Next, by referring to FIGS. 9A to 9C, the description will be given of one example of the linearizing conversion in which the area is switched by the peak detection or the focus sum detection and the conversion is performed by referring to the table shown in FIG. 7. FIG. 9A is a diagram showing the table which is shown in FIG. 7. FIG. 9B shows an example of the focus error signal inputted to the linearizing converter 5 when the actuator 1 is moving with a constant temporal variation (i.e., constant speed). FIG. 9C shows the result of the linearizing conversion of the focus error signal shown in FIG. 9B with the aid of the table shown in FIG. 9A.

First, in the AREA1 shown in. FIG. 9B, the conversion table for the AREA1 shown in FIG. 9A is referred to, and w(t) is outputted for the focus error value v(t1) at the time t1, and w(t2) is outputted for the focus error value v(t2) at the time t2. The value in the table increases linearly up to the focus error value v(t2). For the focus error value after the focus error value v(t2), the table is designed such that the gain gradually increases according to the increasing rate of the focus error signal gradually decreases. Such an output of the converter is shown in FIG. 9C, which shows that the focus error signal in the AREA1 is linearized.

In the AREA2 shown in FIG. 9B, the conversion table for the AREA2 shown in FIG. 9A is referred to. As shown in FIG. 9A, the conversion table for the AREA2 is different from that for the AREA1, and the offset in the conversion table for the AREA2 is set larger than that in the conversion table for the AREA1. According to the conversion table for the AREA2, w(t3) is outputted for the focus error signal value v(t3) at the time t3, and similarly w(t4) to w(t10) are outputted for the focus error signal values v(t4) to v(t10). For the focus error signal from the border of the AREA1 and AREA2 to the focus error signal value v(t4) at the time t4, a table is used in which the gain gradually decreases according to the gradual increase of the decreasing rate of the focus error signal. From the focus error value v(t5) at the time t5 to the zero-crossing of the focus error signal, the decreasing rate of the focus error signal gradually decreases, and hence a table is used in which the gain gradually increases correspondingly. From the zero-crossing of the focus error signal to focus error value v(t8) at the time t8, the decreasing rate of the focus error signal gradually increases, and hence a table is used in which the gain gradually decreases correspondingly. Further, for the focus error signal from the focus error value v(t9) at the time t9 to the border of the AREA2 and AREA3, a table is used in which the gain gradually increases according to the gradual decrease of the decreasing rate of the focus error signal. Still further, for the focus error signal from the focus error value v(t4) to the focus error value v(t8), and from the focus error value v,(t5) to the focus error value v(t9), a table is used in which the gain linearly increases according to the decrease of the focus error signal.

In the AREA3 shown in FIG. 9B, the conversion table for the AREA3 is referred to. As shown in FIG. 9A, the conversion table for the AREA3 is identical to the table for the AREA1, but the conversion table for the AREA 3 has an offset still larger than that of the conversion table for the AREA2. According to the conversion table for the AREA3, w(t11) is outputted for the focus error value v(t11) at the time t11, and w(t12) is outputted for the focus error value v(t12) at the time t12. The value in the table linearly increases for the focus error value after the focus error value v(t11) at the time t11. For the focus error signal value after the thee value v(t11) at the time t10, the values in the table linearly increases. For the focus error value from the border of the AREA2 and AREA3 to the focus error value v(t11), the table is used in which the gain gradually decreases according to the gradual increase of the increasing rate of the focus error signal.

The output of the converter described above is shown in FIG. 9C. It is understood that, the focus error signal shown in FIG. 9B is thus linearized to obtain the linear positional output.

(6) Stabilizing Compensator

Figure 10:
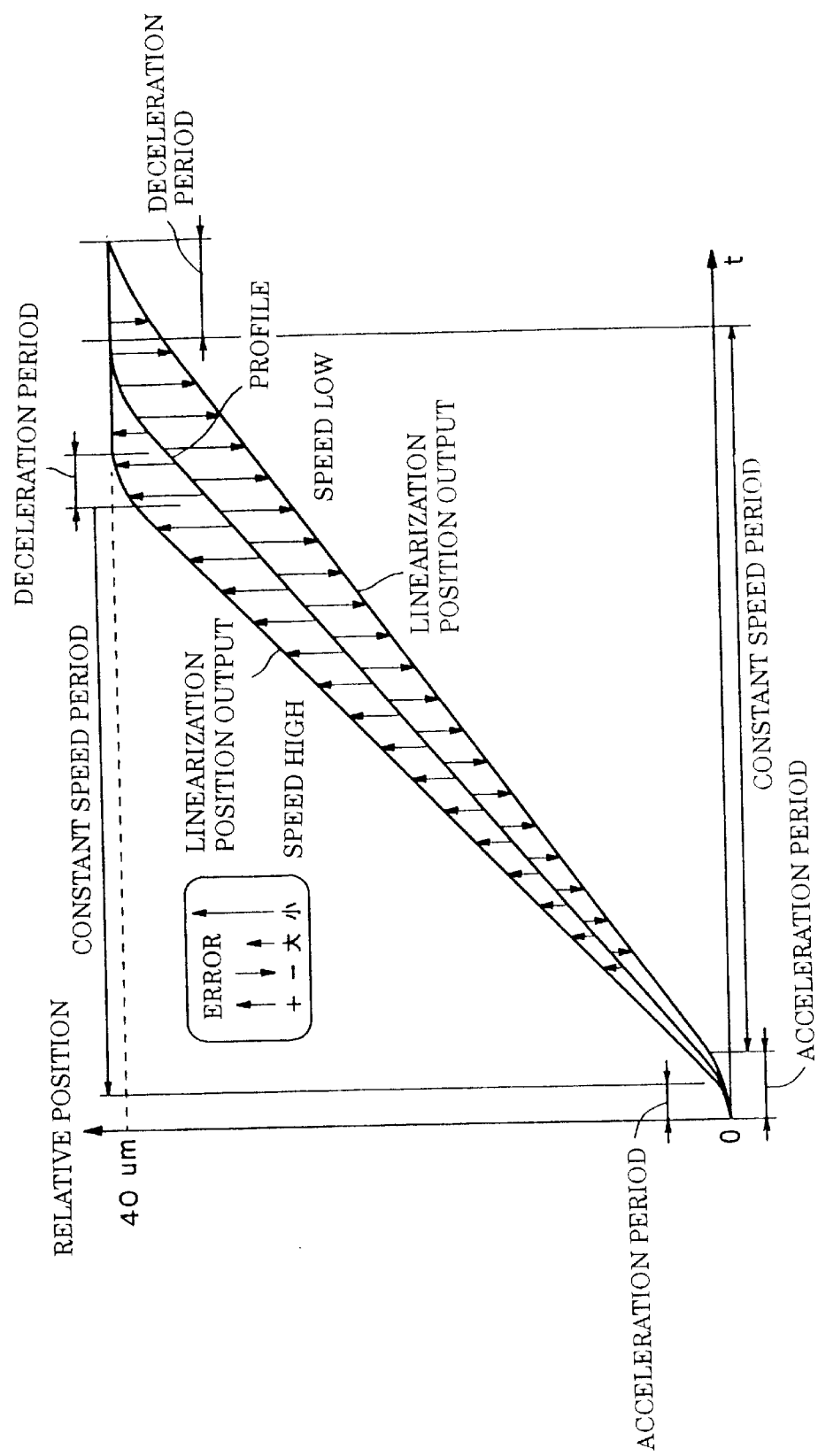
FIG. 10 is a graph showing the linearized positional outputs, with respect to the reference position, in the cases where the speed is high and where the speed is low.

Referring back to FIG. 1, the stabilizing compensator 6 compares the linearized positional output from the linearizing converter 5 with the profile outputted by the reference position detector 3 and having a constant speed period between the acceleration period and the deceleration period as shown in FIG. 3A, and then supplies the drive signal to the actuator, serving as a controlled element, such that the positional error obtained by the above comparison is reduced. FIG. 10 shows an example of the position error in cases where the actuator 1 moved with a speed higher and lower than the speed of the target profile. It is noted that the linearized positional output varying in the quadratic function manner in the accelerating and deceleration period and varying linearly in the constant speed period is used for both high speed and low speed cases.

As described above, in this embodiment, the constant speed period is provided in the profile serving as the target value of the feedforward control, and the positional output serving as the control amount of the actuator 1 is fed back as the linearized positional output obtained by the linearizing conversion of the focus error signal. Thus, the profile is compared as the reference position to obtain the positional error, thereby to establish the closed loop. In other words, the focus jump device of this embodiment performs the feedforward control, which was conventionally performed by an open control, as the combination with the feedback control. This can remarkably reduce the influence by the external disturbance and enables stable focus jump. In addition, as shown in FIG. 2, the frequency band of the focus jump is sufficiently high like some kHz so that the tracking only by the feedback control is difficult. In this embodiment, however, by introducing the feedforward control, the stable control is achieved in the high frequency band. Further, in the focus jump device of this embodiment, the feedback loop is closed during the focus jump to operate as if the focus servo is constantly active. Therefore, the shock can be diminished when the focus servo is activated at the end of the focus jump. As a result, the disturbance after finishing the focus jump is small, and the focus serve can be quickly converged.

Further, in the focus jump device of this embodiment, the target value and the error are given like the case of the focus servo control, and hence the same stablizing compensator 6 can be used in both the focus jump operation and the focus servo operation. It is noted, however, that since the focus jump operation ends instantaneously, the purpose of the compensation is somewhat different from that in the focus servo control. Therefore, the characteristic of the stabilizing compensator may be different between the focus jump timing and the focus servo timing. Further, the characteristic of the stabilizing compensator may be varied gradually from the focus jump timing to the focus servo timing. For instance, with respect to the steady-state characteristic, the gain at the low frequency band is large in order to suppress the steady-state error in normal focus servo control. However, this frequency band is out of the focus jump frequency band, and hence the gain in the low frequency band may be small to ensure the phase margin in the high frequency band. Since the transient response is an evaluation factor of the focus jump performance and the steady-state response is an evaluation factor of the normal focus servo control, and hence the stabilizing compensator is designed to be given a weight in the quick response during the focus jump and the stability during the normal focus servo operation. Furthermore, the positional information fed back during the focus jump period is estimated from a non-linear focus error signal and includes the external disturbance due to the estimation error, especially at the time of area switching. Therefore, at the time of focus jump, a filter for rejecting external disturbance may be added to the stabilizing compensator, or the feedback gain may be lowered.

(7) Overall Operation

Next, the description will be given of the overall operation the focus jump device of the present embodiment. First, the reference position generator 3 outputs the profile having the locus shown in FIG. 3A. This profile is designed such that the acceleration period T1 and the deceleration period T3 are relatively short and the constant speed period T2 is sufficiently long. When this profile is supplied to the feedforward compensator 2, the actuator 1 receives the acceleration pulses shown in FIG. 3C for a short time period and starts moving. Thereafter, no feedforward output is supplied to the actuator 1 until the deceleration pulses are supplied. Therefore, in the constant speed period, the actuator 1 moves at a constant speed relative to the track, and the objective lens also moves at the constant speed. Since the profile, serving as the target value, varies with a constant slope within the constant speed period, the target value band is apparently much lower than the focus jump band, thereby an effective feedback control being achieved. Namely, when the actuator 1 starts moving as described above, the position detector 4 outputs the focus error signal as shown in FIG. 5B. After the focus error signal is applied to the linearlizing conversion to be converted to the linearized positional output, the profile and the linearized positinal output are compared with each other to obtain the positional error as shown in FIG. 10. Then, the stabilizing compensator 6 supplies the drive signal to the actuator 1 to suppress the positional error. At the end of the constant speed period and immediately before the tracking servo pull-in operation, the deceleration pulse as shown in FIG. 3C is outputted to make the actuator 1 start deceleration. Since the deceleration is performed in a short time period, the influence in the high frequency band area is small, and the pull-in operation of the tracking servo loop can be quickly completed. It is noted that the device may be configured such that the feedback control is performed within the acceleration period and the deceleration period.

On the contrary, in the conventional focus jump device, as shown in FIGS. 11 and 12, a feedforward type open control is performed in which acceleration pulses of a given pulse width are outputted simultaneously with the start of the focus jump and then deceleration pulses of a given pulse width are outputted at the timing when the focus error signal becomes smaller than a given threshold. As a result, if an external disturbance takes place due to the disc surface vibration or irregularity of surface spacing, the focus servo pull-in operation is disturbed and focus servo may be disturbed at the worst case. FIGS. 11 and 12 show jump operation failure by the conventional focus jump device. FIG. 11 shows the case in which the external disturbance takes place in the acceleration direction or the surface spacing is smaller than the predefined value, and FIG. 12 shows the case in which the external disturbance takes place in the deceleration direction or the surface spacing is larger than the predefined value. As seen in FIGS. 11 and 12, the focus error signal takes the value out of the focus servo control band immediately after servo closing and the jump is unsuccessful.

On the contrary, in the focus jump device according to this embodiment, the feedback control is performed together with the feedforward control. Therefore, the device is resistant to the external disturbance, and stable focus jump may be achieved even in the presence of the disc surface vibration or surface spacing irregularity. Particularly, this embodiment uses a profile including the constant speed period between the acceleration period and the deceleration period, and performs the linearizing conversion of the focus error signal, hence it takes the advantage of the feedback control extremely effectively. In contrast, since the conventional focus jump device uses the non-linear focus error signal as described above, stable feedback control is not achieved.

Figure 13A:
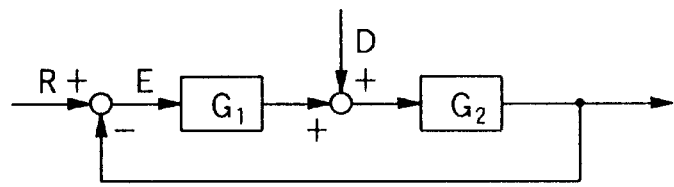
FIG. 13A is a diagram showing a model of feedback system.

Now, the difference of the steady-state error will be described for the case in which the target value is a constant speed input and a constant acceleration input. It is noted that the following description uses a direct feedback system in which a compensating element having a transfer function $G_1(s)$ is directly coupled to a controlled system having a transfer function $G_2(s)$, as shown in FIG. 13A. Here, it is supposed that the transfer function $G_2(s)$ of the controlled system is a first-order lag system.

$$G_2(s) = K/(1+Ts) \tag{1}$$

[K: Gain constant, T: Time constant]
An integral element is used as the compensating element. The transfer function of the compensating element is as follows.

$$G_1(s) = 1/s \tag{2}$$

Therefore, the open-loop transfer function of the direct feedback system shown in FIG. 13A is as follows.

$$\begin{aligned} G(s) &= G_1(s) \cdot G_2(s) \\ &= K/\{(1+Ts)s\} \end{aligned} \tag{3}$$

Supposing that the target value is R(s), the control error E(s) of the direct feedback system is as follows.

$$E(s) = R(s)/\{1+G(s)\} \tag{4}$$

Here, supposing that the control error is e(t), the steady-state error $e(\infty)$ is obtained as follows using the last value theory in Laplace transform.

$$e(\infty) = \lim_{t \to \infty} e(t) = \lim_{s \to 0} sE(s) \tag{5}$$

Here, sE(s) in FIG. 13A is obtained. First, from the equation (3)

$$\begin{aligned} 1+G(s) &= 1 + K/\{(1+Ts)s\} \\ &= (Ts^2+s+K)/\{(1+Ts)s\} \end{aligned} \tag{6}$$

stands, and from the equations (6) and (4), $$E(s) = R(s)(1+Ts)s/(Ts^2+s+K) \tag{7}$$

is obtained. By multiplying "s" by both sides of the equation (7), sE(s) is obtained as follows.

$$sE(s) = R(s)(1+Ts)s^2/(Ts^2+s+K) \tag{8}$$

Figure 13B:
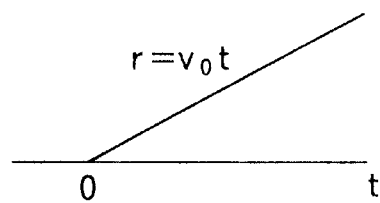
FIG. 13B is a graph for explaining a constant speed input to be supplied to the feedback system shown in FIG. 13A.

Next, the steady-state error $e(\infty)$ in the case of the constant speed as shown in FIG. 13B, like the focus jump device of the present embodiment having the desired value r(t), is calculated based on the equations (5) and (8). Taking the constant speed input in FIG. 13B into account, the desired value r(t) and R(s) are as follow.

$$R(t) = v_0 t, \; R(s) = v_0/s^2 \tag{9}$$

Accordingly, from the equation (8), sE(s) is obtained as follows.

$$\begin{aligned} sE(s) &= (V_0/s^2)(1+Ts)s^2/(Ts^2+s+K) \\ &= v_0(1+Ts)/(Ts^2+s+K) \end{aligned} \tag{10}$$

Accordingly, from the equation (5), the steady-state error $e(\infty)$ is obtained as follows.

$$e(\infty) = \lim_{s \to 0} v_0(1 + Ts)/(Ts^2 + s + K) = v_0/K \quad (11)$$

Figure 13C:
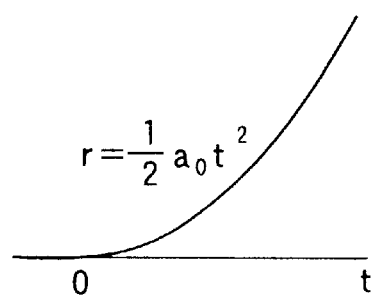
FIG. 13C is a graph for explaining a constant acceleration input to be supplied to the feedback system shown in FIG. 13A.

Next, the steady-state error $e(\infty)$ in the case where the desired value is of constant acceleration as shown in FIG. 13C is obtained based on the equations (5) and (8). Taking the constant acceleration input in FIG. 13C into account, the desired values $r(t)$ and $R(S)$ are as follows.

$$r(t)=(\tfrac{1}{2})a_0 t^2, R(s)=a_0/s^3 \quad (12)$$

Accordingly, from the equation (8), $sE(s)$ is obtained as follows.

$$sE(s) = (a_0/s^3)(1 + Ts)s^2/(Ts^2 + s + K) \quad (13)$$
$$= (a_0/s)(1 + Ts)/(Ts^2 + s + K)$$

Accordingly, from the equation (5), the steady-state error $e(\infty)$ is obtained as follows.

$$e(\infty) = \lim_{s \to 0}(a_0/s)(1 + Ts)/(Ts^2 + s + K) \quad (14)$$
$$= \lim_{s \to 0}(a_0/K)/s = \infty$$

Comparing the equation (11) with the equation (14), the steady-state error converges to the constant ($v_0/K$) when the desired value is of constant speed, and the steady-state error becomes and diverges when the desired value is of constant acceleration. Therefore, if the controlled system and the compensator are common, the control error is larger in the case that the desired value is of constant acceleration than the case that the desired value is of constant speed. Namely, in an attempt to perform feedback control with the conventional focus jump device, the constant speed desired value cannot used as shown in FIG. 13B and there is no choice other than using complicatedly varying desired value. There are areas in which the desired value which can be approximated to the constant acceleration as shown in FIG. 13C is possibly used. Even if such desired value which can be approximated to a constant acceleration is used, control is extremely difficult as compared with the case of the focus jump device of the present invention, and it is obvious that the error is much larger than that in the focus jump device of the present invention.

On the contrary, the focus jump device of the present invention uses the constant speed desired value as shown in FIG. 3A, the feedback control can be achieved extremely easily as compared with the conventional focus jump device, and the error is much smaller than the case of the conventional focus jump device.

Figures 14A, 14B, 14C:
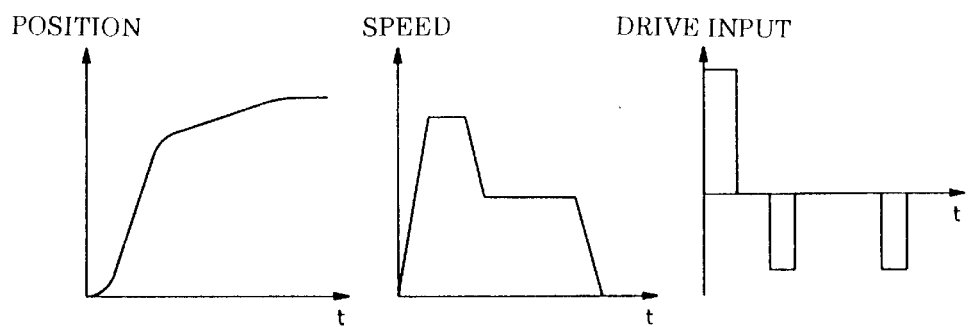
FIG. 14A is a graph showing a profile accelerating stepwise.
FIG. 14B is a graph showing the speed variation obtained by the first-order differentiation of the profile shown in FIG. 14A.
FIG. 14C is a graph showing the feedforward output obtained by the second-order differentiation of the profile shown in FIG. 14A.

The profile usable in the focus jump device of the present invention is not limited to the profile including the constant speed period between the acceleration period and the deceleration period, as shown in FIG. 3A. For example, it is possible to use the profile in which the constant speed period is divided into the high-speed period and the low-speed period as shown in FIG. 14A and the speed decreases stepwise as shown in FIG. 14B. With this profile, as shown in FIG. 14C, the deceleration pulses are applied twice after the acceleration pulse is applied so as to approach the desired value greatly with a large step at first and then gradually approach the desired value with smaller steps. Therefore, precise control can be made immediately before the pull-in operation. It is noted that the constant speed period may be divided into larger number of steps and the deceleration pulses may be applied for multiple times after applying the acceleration pulse.

Figures 15A, 15B, 15C:
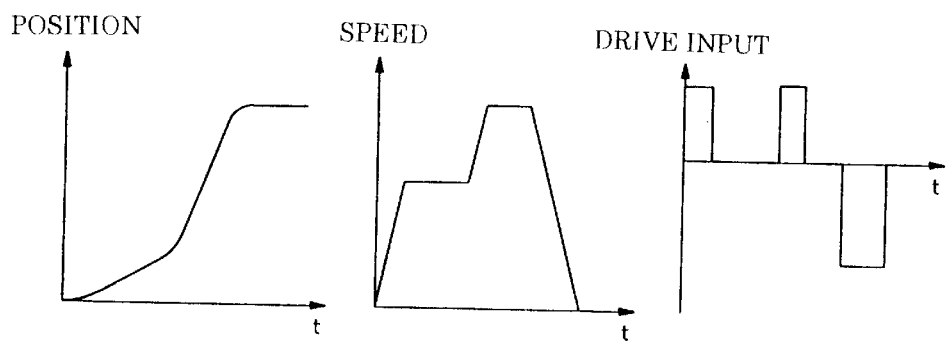
FIG. 15A is a graph showing a profile accelerating stepwise.
FIG. 15B is a graph showing the speed variation obtained by the first-order differentiation of the profile shown in FIG. 15A.
FIG. 15C is a graph showing the feedforward output obtained by the second-order differentiation of the profile shown in FIG. 15A.

Alternatively, it is possible to use the profile in which the constant speed period is divided into the high-speed period and the low-speed period as shown in FIG. 15A and the speed accelerates stepwise as shown in FIG. 15B. With this profile, a large deceleration pulse is applied after the acceleration pulses are applied twice as shown in FIG. 15C, so as to slowly performs the focus jump with maintaining the acceleration and/or deceleration amount of a certain degree. When the feedback is made with slow acceleration, the control becomes effective immediately after the start of the focus jump, and it is possible to suppress the external disturbance due to the variation of the initial condition of the focus jump. Also in this case, the deceleration pulses may be applied more than twice.

Figures 16A, 16B, 16C:
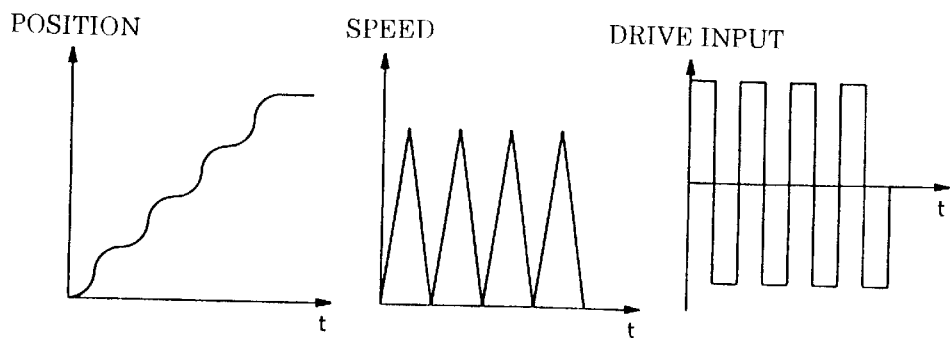
FIG. 16A is graph showing a profile in which no constant speed period exists and acceleration periods and deceleration periods alternately appears.
FIG. 16B is a graph showing the speed variation obtained by the first-order differentiation of the profile shown in FIG. 16A.
FIG. 16C is a graph showing the feedforward output obtained by the second-order differentiation of the profile shown in FIG. 16A.

Alternatively, it is possible to use the profile which includes no constant speed period and in which the acceleration period and the deceleration period alternately appear, as shown in FIG. 16A. With this profile, by repeating the acceleration and the deceleration as shown in FIG. 16B, the acceleration amount and the deceleration amount increase. As the amount of the acceleration pulses and the deceleration pulses are increased, the influence by the external disturbance may be suppressed. Therefore, the total amount of the acceleration pulses and the deceleration pulses may be increased to suppress the influence by the external disturbance, and the control may approach to the desired value stepwise in order to avoid the disadvantage resulting from the fact that the time required for the focus jump gets shorter. With this profile, while the feedback control becomes slightly difficult, a large acceleration and/or deceleration amount may be applied when no feedback is employed, thereby suppressing the influence by the external disturbance.

As described above, according to the focus jump device of this embodiment, profiles having various loci may be used. Particularly, when the profile shown in FIG. 3A is used, the control system may be simplified in configuration, and the actuator may respond relatively easily. In addition, the reference position generator 3 may be configured to generate various profiles described above and to output an appropriate profile in accordance with the condition of the external disturbance. Further, the respective profiles may be determined based on the experimental results, with taking account of the stability against the external disturbance, the pull-in speed of the tracking servo and the like.

(8) Experimental Example

Figure 17:
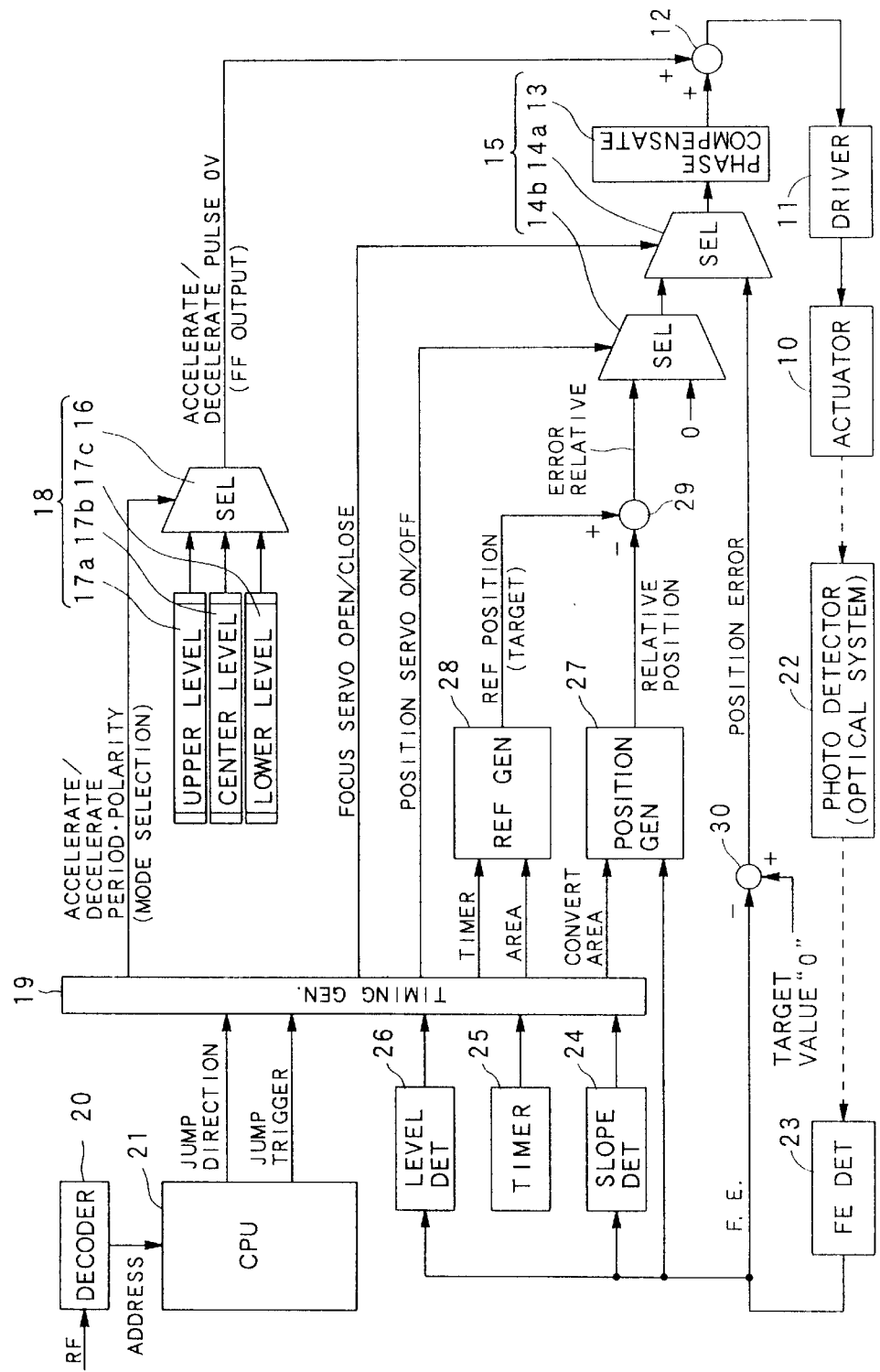
FIG. 17 is a block diagram showing a focus jump device employed in an experimental example of the first embodiment of the present invention.
Figure 23:
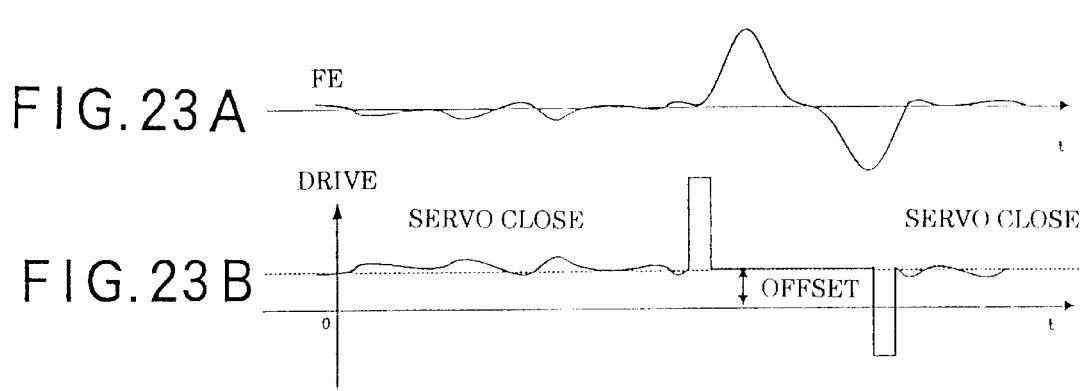

Next, an experimental example according to the first embodiment will be described with reference to FIGS. 17 and 18. FIG. 17 is a block diagram showing a configuration of the focus jump device employed in this experimental example. It is noted that the function of the device is achieved by the execution of predetermined programs by the DSP, except for the actuator 10, the driver 11, the photodetector 22, the decoder 20 and the CPU 21.

In FIG. 17, the actuator 16 has a movable portion for carrying an object lens and a supporting portion for supporting the movable portion by a spring or the like. The actuator 10 moves the movable portion toward the disc from its lower side in the vertical direction in response to the drive signal supplied from the driver 11. The driver 11 generates the drive signal in response to the input signal. The adder 12 adds the phase-compensated signal outputted from the stabilizing compensator 15 to the feedforward signal outputted from the feedforward compensator 18, and supplies the resultant signal to the driver 11 as the input signal thereto. The actuator 10 and the driver 11 are the elements corresponding to the actuator 1 shown in FIG. 1. The feedforward compensator 18 includes a selector unit 16, as well as an upper level setting unit 17a, a center level setting unit 17b and a lower level setting unit which are connected to the selector unit 16. The selector unit 16 select one of the upper level setting unit 17a, the center level setting unit 17b and the lower level setting unit 17c in response to the control signal supplied from the timing generation unit 19, and outputs a signal of a voltage level of one of the upper level, the center level and the lower level for a predetermined time period. The signal of the upper level voltage serves as the acceleration pulse signal, the signal of the lower level voltage serves as the deceleration pulse signal, and the signal of the center level voltage serves as the constant speed signal. The timing generation unit 19 determines the acceleration time period, the constant speed time period and the deceleration time period as well as the polarity of the signals in response to the jump trigger signal and the jump direction signal supplied from the CPU 21, and supplies, to the selector unit 16 of the feedforward compensator 18, the control signal of a given polarity required to permit the selector unit 16 to output the acceleration pulse signal, the constant speed signal or the deceleration pulse signal. A decoder 20 is connected to the CPU 21, and the decoder 20 decodes the RF signal to obtain the address, refers to the address to compares the currently captured signal recording surface with the signal recording surface to be jumped to based on the address, and outputs the jump trigger signal and the jump direction signal.

By the CPU 21, the timing generation unit 19 and the feedforward compensator 18 described above, the feedforward signal is supplied to the adder 12 to achieve the feedforward control. In other words, the CPU 21, the timing generation unit 19 and the feedforward compensator 18 constitute the feedforward compensator. 5 shown in FIG. 1. In addition, in the focus jump device of this example, the pulse-type feedforward output is not obtained by the second order differentiation of the above mentioned profile, but obtained by setting the levels of the pulse signal corresponding to the profile, in advance, by the upper level setting unit 17a, the center level setting unit 17b and the lower level setting unit 17c as well as by storing the timing data of the pulse signal in the timing generation unit 19, thereby obtaining the pulse-type feedforward output.

The stabilizing compensation unit 15 corresponding to the stabilizing compensator 6 shown in FIG. 1 includes a phase compensator unit 13 and selector units 14a and 14b. The phase compensator unit 13 supplies the drive signal to the driver 11 such that the positional error at the time of the focusing servo, selected by the selector unit 14a, or the positional error in the feedback control at the time of the focus jump, supplied via the selector unit 14b, becomes small. The selector unit 14a receives, from the timing generation unit 19, a signal for switching the open/closed state the focus servo. The selector unit 14a supplies the positional error in the feedback control at the time of the focus jump to the phase compensation unit 13 when the focus servo is switched to the open state, and supplies the positional error at the time of the focus servo to the phase compensation unit 13 when the focus servo is switched to the closed state. The selector unit 14b receives the signal for switching the ON/OFF state of the position servo from the timing generation unit 19. The selector 14b outputs the positional error in the feedback control at the time of the focus jump when the position servo is switched to the ON-state, and outputs the zero-level voltage when the position servo is switched to the OFF state. This zero-level output ensures that the feedback control is not performed in the indefinite area of the focus error signal a shown in FIG. 18A. The size of the indefinite area varies dependently upon the correlation between the sizes of the capture range in the focus servo control and the interlayer spacing. For example, supposing that the interlayer spacing is constant, if the capture range is set large enough to induce the reflected light crosstalk between two layers, no indefinite area takes place as seen in FIGS. 19A and 19B. If the capture range is set to a medium size to avoid the reflected light crosstalk between two layers, a small indefinite area takes place as seen in FIGS. 20A and 20B. If the capture range is set to be small to securely avoid the reflected light crosstalk between two layers, a large indefinite area takes place as seen in FIGS. 21A and 21B. Even if the capture range is constant, the size of the indefinite area varies according to the irregularity of the surface spacing. Namely, assuming that the capture range is of a constant size, the indefinite area gets larger if the surface spacing is larger than a defined value and gets smaller if the surface spacing is smaller than the defined value. Within the indefinite area, since no position information can be obtained from the focus error signal, performing the feedback control during the time period of the indefinite area makes the control unstable. In this view, as shown in FIGS. 18A and 18B, this embodiment sets the positive, first threshold close to the zero-level of the focus error signal, and the negative, second threshold close to the zero-level of the focus error signal. Then, the indefinite area is detected as an area in which the focus error signal takes the value which smaller than the first threshold and larger than the second threshold, and then the selector 14b receives the switching signal selecting the OFF-state of the position servo within this indefinite to inhibit the feedback control.

Referring back to FIG. 17, the photodetector 22 has a photoelectric transducer having a light receiving surface divided into four elements. The photoelectric transducer converts the returned light beam from the recording track into the electric signal. The photoelectric transducer is of the similar configuration to the light receiving element 40 shown in FIG. 4. The photodetector 22 is connected to the focus error signal detection unit 23 which receives the electric signal. Similarly to the position detector 4 shown in FIG. 4, the focus error signal detection unit 23 includes an astigmatism generator. 41 and a differential amplifier 42. The reflected light from the signal recording surface passes through the astigmatism generator 41 to be incident upon the light receiving element 40 divided into the four areas A to D. The outputs of the diagonally-positioned light receiving elements are added to each other (i.e., Va+Vd, Vb+Vc), and the differential amplifier 42 operates the difference of the sum signals to produce the focus error signal as shown in FIG. 5B. To the focus error signal detection unit 23, a slope detecting unit 24, a level detecting unit 26, a position generation unit 27 and a subtracting unit 30 so that the focus error signal is supplied to those components. In the focus jump device of this example, the photodetector 22 and the focus error signal detection unit constitute the position detector 4 shown in FIG. 1.

The slope detection unit 24 is a circuit to detect the polarity of the slope of the focus error signal. The slope detection unit 24 outputs a signal which changes from high-level to low-level when the polarity of the slope changes from positive to negative, and outputs a signal which changes from low-level to high-level when the polarity of the slope changes from negative to positive. The output of the slope detection unit 24 is supplied to the timing generation unit 19, which outputs an area judgement signal, as shown in FIG. 5B, based on the output change of the slope detection unit 24. The polarity of the focus error signal slope switches at the peak positions of the focus error signal. Therefore, the areas described above can be discriminated from the peak position of the focus error signal. The timer 25 starts operating when triggered by the start signal inputted from the CPU 21, and supplies a time-up signal to the timing generation unit 19 when the timer value set by the CPU 21 becomes zero. Namely, a time period from a desired timing can be counted by setting the timer value to an appropriate value and staring counting at an appropriate timing. The focus jump device of this example is configured to not only switches the areas by using the slope detection unit 24, but also switches the areas by using the timer 25 at every given time period. The level detection unit 26 compares the focus error signal with the first to third threshold values shown in FIG. 18A, and supplies the comparison result to the timing generation unit 19. By this, the output timings of the ON/OFF switching signal of the position servo and the output timings of the acceleration/deceleration pulses are determined.

The timing generation unit 19 outputs the open/close switching pulses of the focus servo as well as the ON/OFF switching signal of the position servo and the output start signal of the acceleration/deceleration pulses. If the slope detection unit 24 outputs the signal indicating the detection of a positive peak value, the timing generation unit 19 outputs the switching signal from the AREA1 to AREA2 when the focus error signal becomes smaller than the positive threshold. If the slope-detection unit 24 outputs the signal indicating the detection of a negative peak value, the timing generation unit 19 outputs the switching signal from the AREA2 to AREA3 when the focus error signal becomes larger than the negative threshold value. With this arrangement, the areas can be correctly switched even if focus error signal includes noise component. The area switching signal, thus outputted by the timing generation unit 19, is supplied to the position generation unit 27.

The position generation unit 27 generates addresses of the conversion table to be referred to for the linearizing conversion of the focus error signal, while referring to the area switching signal outputted by the timing generation unit 19. Then, the position generation unit 27 refers to the pre-stored conversion table based on the address, and outputs the value set in the conversion table corresponding to the sampled focus error value. The conversion table is configured such that separate conversion tables for AREA1, AREA2 and AREA3 are assigned with different addresses, respectively, and the values as shown in FIG. 7 are stored in the respective conversion tables with a given resolution. Accordingly, each conversion table is referred to and stored values are read out, and then the linearizing conversion of the focus error signal is executed as shown in FIG. 9C.

As described above, in the focus jump device of this example, the linearizing converter 5 is constituted by the slope detection unit 24, the timer 25, the timing generation unit 19 and the position generation unit 27.

The reference generation unit 28 generates address of the reference table based on the count signal outputted by the timing generation unit 19. The timing generation unit 19 is configured to output different count signal in accordance with the pulse width of the pulse signal serving as the feedforward output, and the pulse width can be selected by the CPU 21. Therefore, when the signal having a given pulse width is supplied from the CPU 21 to the timing generation unit 19, the timing generation unit 19 supplies the control signal so that the feedforward compensation unit 18 generates the pulse signal having such pulse width, and supplies the simple count signal to the reference generation unit 28. Thus, the reference generation unit 18 generates the address in the reference table corresponding to the pulse width, and refers to the reference table to output the value preset therein based on the address thus generated. The reference table stores profiles for drawing given loci according to the feedforward control. For example, as shown in FIG. 10, a waveform which is non-linear in the acceleration period and the deceleration period and which is linear in the constant speed period may be outputted. As described above, in the focus jump device of this example, the reference position generator 3 is constituted by the CPU 21, the timing generation unit 19 and the reference generation unit 28.

The profile outputted by the reference generation unit 28 and the linearized positional output from the position generation unit 27 are operated by the addition/subtraction unit 29 to output the positional error as shown in FIG. 10, for example. The positional error is supplied to the selector unit 14b, and is supplied to the selector unit 14a when the timing generation unit 19 supplies the signal for switching the position servo to ON-state to the selector unit 14b. The selector 14a supplies the positional error to the phase compensation unit 13 when the timing generation unit 19 outputs the signal for opening the focus servo, thereby forming the closed loop at the time of the focus jump. When the timing generation unit 19 outputs the signal for closing the focus servo to the selector 14a, the selector 14a supplies the focus error signal outputted via the subtracter 30 to the phase compensation unit 13 as the positional error, thereby forming the closed loop at the time of the focus servo.

Next, the operation of the focus jump device in this example will be described. When the CPU 21 outputs the jump trigger, the timing generation unit 19 switches the focus servo open/close signal to the low level at time t0 as shown in FIG. 18B so that the selector unit 14a supplies the output of the selector unit 14b to the phase compensation unit 13. At the same time, the timing generation unit 19 switches the position servo ON/OFF signal to the high level as shown in FIG. 18D so that the selector unit 14b outputs the position error outputted by the addition/subtraction unit 29. Further, at time t0, the reference generation unit 28 outputs the profile as shown in FIG. 18E so that the feedforward compensation unit 18 supplies the feedforward output corresponding to the profile and shown in FIG. 18H to the driver 11. By this, the actuator 10 starts jumping and moves the laser beam spot so that the focus error detection unit 23 detects the focus error signal as shown in FIG. 18A. The focus error signal is supplied to the slope detection unit 24, which supplies the signal, indicating that the focus error signal has the positive slope before reaching the positive peak value, to the timing generation unit 19. The timing generation unit 19 outputs the high-level signal as shown in FIG. 18C as the conversion area signal based on the detection result, and indicates that the current area is AREA1 shown in FIG. 5B. The conversion area signal is supplied to the position generation unit 27, which selects the conversion w table for the AREA1 based on this output, performs the linearizing conversion of the focus error signal using the conversion table for the AREA1, and outputs the linearized position as shown in FIG. 18F. The linearized position output is compared with the reference position of the profile by the addition/subtraction unit 29 to obtain the position error shown in FIG. 18G. The position error is supplied to the phase compensation unit 13 via the selector units 14b and 14a, and the phase compensation unit 13 feeds back the drive signal as shown in FIG. 18I so as to reduce the position error. As a result, the actuator 10 continues the jump to follow the reference position with high accuracy even if external disturbance takes place.

Next, at time t1, the slope detection unit 24 detects that the focus error signal reaches the positive peak value, and the timing generation unit 19 outputs the area conversion signal changing to the low level as shown in FIG. 18C. When receiving the conversion area signal, the position generation unit 27 recognizes that the area has changed from AREA1 to AREA2, and selects the conversion table for AREA2 to perform the linearizing conversion of the focus error signal. As a result, the non-linear focus error signal as shown in FIG. 18A is linearized as shown in FIG. 18F, and the stable feedback control is performed based on the linearized positional output.

Next when the level detection unit 26 detects, at time t2, that the focus error signal becomes smaller than the first threshold value as shown in FIG. 18A, the timing generation unit 19 switches the position servo ON/OFF signal to the low level as shown in FIG. 18B, and the zero-level voltage is outputted from the selector 14b. Thus, the feedback control is inhibited during the indefinite area of the focus error signal. Then, when the level detection unit 26 detects, at time t3, that the focus error signal becomes smaller than the second threshold value as shown in FIG. 18A, the timing generation unit 19 changes the position servo ON/OFF signal to the high-level, as shown in FIG. 18B, based on the detection result, so that the selector 14b outputs the position error once again. Thus, the feedback control is resumed.

Then, when the slope detection unit 24 detects, at time t4, that the focus error signal reaches the negative peak value, the timing generation unit 19 changes the conversion area signal to the high-level as shown in FIG. 18C. This conversion area signal is inputted to the position generation unit 27, which recognizes that the area of the focus error signal has changed from the AREA2 to AREA3, and selects the conversion table for AREA3. Then, the focus error signal is linearized by using the conversion table for AREA3.

Then, when the level detection unit 26 detects that the focus error signal becomes larger than the third threshold value at time t5, the timing generation unit 19 supplies the output start signal of the deceleration pulses to the feedforward compensation unit 18. By this, the feedforward compensation unit 18 outputs the deceleration pulses, as shown in FIG. 18H, to the driver 11. As a result, the actuator 10 starts deceleration. Then, at time t6 at which the deceleration pulse ends, the timing generation unit 19 changes the focus servo open/close signal to the high-level as shown in FIG. 18B to supply the output of the subtracter 30 to the phase compensation unit 13, and closes the focus servo loop. In addition, the timing generation unit 19 changes the position servo ON/OFF signal to the low-level as shown in FIG. 18D to finish the feedback control.

Thus, the focus servo control is performed at the target recording layer. The focus jump to the target recording layer is carried out, with high accuracy, to follow the reference position by the combined use of the feedforward control and the feedback control, and the laser beam spot substantially reaches the focused position at the end of the deceleration pulse. Therefore, the pull-in operation of the focus servo is completed extremely rapidly as shown in FIG. 18A.

As described above, in the focus jump device of the first embodiment, it is possible to execute a focus jump for an interlayer distance much longer than the capture range of the focus servo. Further, the appropriate position error is obtained based on the linearized positional output obtained by the linearization of the focus error signal, and then the stable feedback control is performed based on this position error during the focus jump. Therefore, the laser beam spot can be moved to the target recording layer with extremely high accuracy even if external disturbance takes place. Further, since the feedback loop is closed during the focus jump to operate as if the focus servo is being ON-state, the shock from the jump to the activation of the focus servo can be reduced. The disturbance after the jump completion is small and the control rapidly converges. In this view, the focus jump device of the present invention- is effective and advantageous in a digital servo system having constraints such as the sampling time and the like.

The actuator 10 used in this example is positioned below the disc 50 and urged by the spring 40 as shown in FIG. 22. When the drive signal is OFF-state, the urging power of the spring is in balance with the gravity, thereby establishing the static balanced position as shown by the broken line in FIG. 22. However, during the focus servo control, a stationary drive signal is being applied to the actuator 10. Accordingly, during the focus jump, the acceleration amount and the deceleration amount may be identical by performing the feedforward output with the offset voltage being applied to the actuator 10 as shown in FIG. 23B.

The present invention is not limited to the feedforward control with such an offset voltage application. The acceleration amount and the deceleration amount may be different from each other between the jump from the lower, first layer to the upper, second layer and the jump from the second layer to the first layer. In other words, in the jump from the first layer to the second layer, the acceleration pulse larger than the deceleration pulse may be applied because the jump should overcome the gravity. In the jump from the second layer to the first layer, the deceleration pulse larger than the acceleration pulse may be applied because the gravity provides a large power in the deceleration direction. When the acceleration pulse and the deceleration pulse are different, the reference position must be changed correspondingly. Also, the conversion table for the linearizing conversion of the focus error signal must be switched to obtain the linearized positional output suitable for the new reference position.

[2] 2nd Embodiment

Next, the second embodiment of the present invention will be described with reference to FIGS. 24 and 25. It is noted that the components identical to those in the first embodiment will be represented by identical reference numerals and the description therefore will be omitted.

In the first embodiment, the focus error signal is compared with a profile having linear areas after the focus error signal is linearized. The focus jump device of the second embodiment is different from the first embodiment in that the non-linearity of the focus error signal is considered and non-linear target value is given. FIG. 24 is a block diagram showing the schematic configuration of the focus jump device of the second embodiment. The components that are identical to those shown in FIG. 1 are applied with the identical reference numerals and the description will be omitted.

Figure 24:
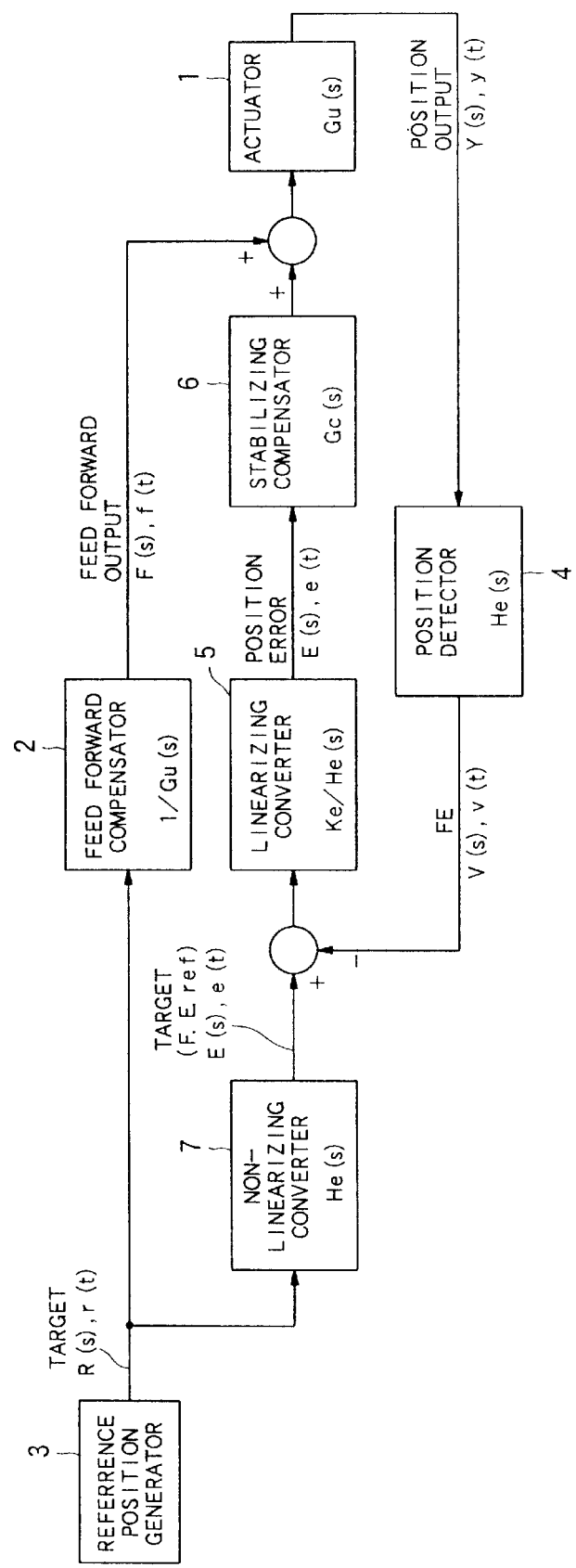
FIG. 24 is a block diagram showing a configuration of a focus jump device according to a second embodiment of the present invention.

As shown in FIG. 24, in the focus jump device of the second embodiment, the focus error signal outputted by the position detector 4 is directly compared with the target before it is linearized. The non-linearizing converter 7 conducts the non-linearizing conversion onto the linear reference position outputted by the reference position generator 3. This is to perform the inverse conversion with respect to the linearizing conversion of the focus error signal in the first embodiment. In practice, a non-linear target value table is stored in a ROM and the stored values are read out therefrom by controlling the read-out address. In order to appropriately moves the objective lens by using the difference between the focus error signal and the target value, the linearizing converter 5 corrects the polarity and the gain of the difference to generate the linear position error. Then, the position error after the correction of the polarity and the gain is supplied to the stabilizing compensator 6, which supplies the drive signal to the actuator 1 to reduce the position error. It is noted that, similarly to the first embodiment, the feedforward output is given to the driver so that the jump profile coincides with the actuator behavior.

Figure 25:
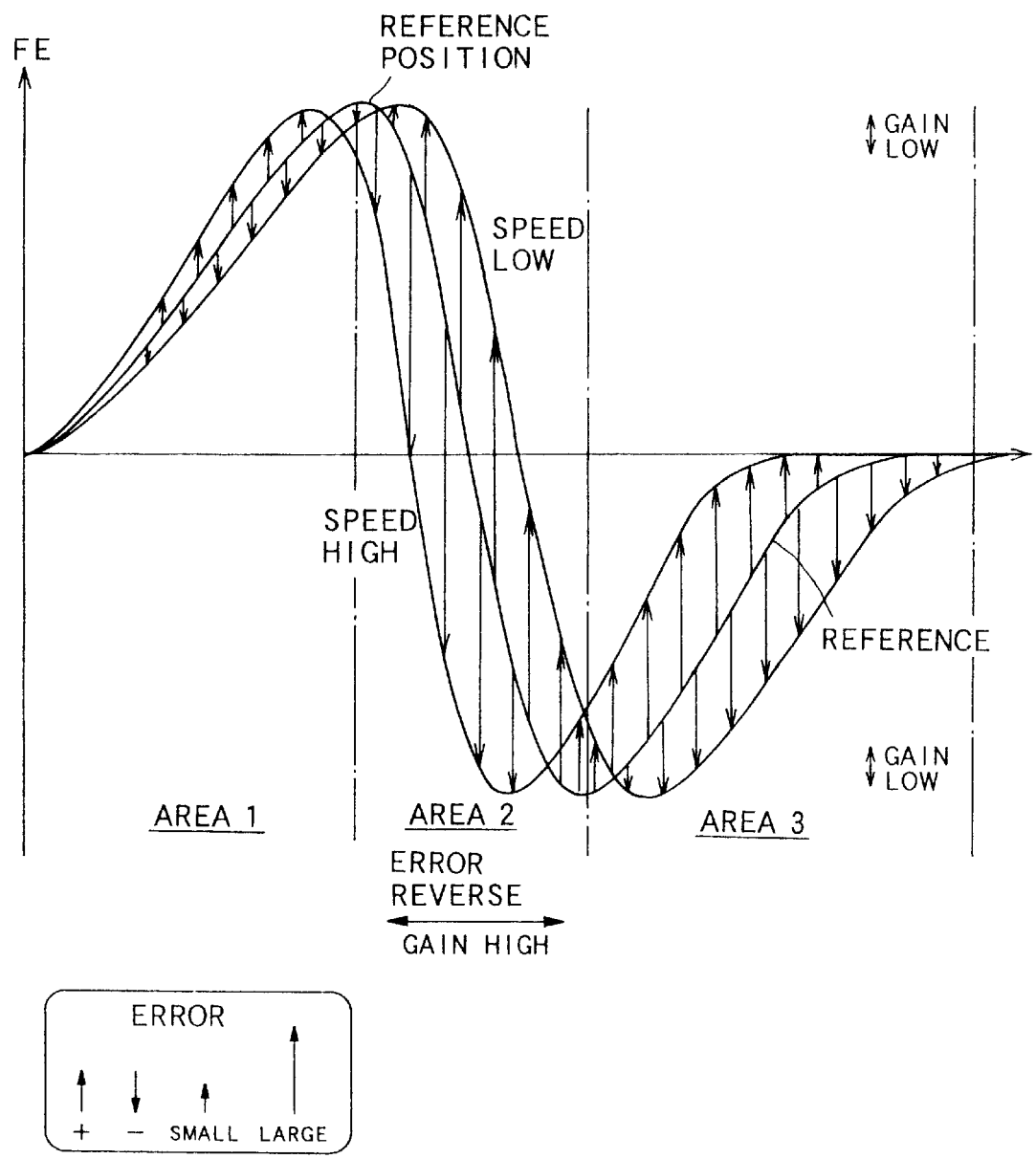
FIG. 25 is waveform diagram showing an error between the reference signal, which serves as a target value in the focus jump device shown in FIG. 24, and the focus error signal.

FIG. 25 shows the target reference signal, the focus error signal obtained when the actuator 1 moves at the speed faster than the constant speed of the profile, and the focus error signal obtained when the actuator 1 moves at the speed slower than the constant speed of the profile. In FIG. 25, by comparing the focus error signal moved in the faster or slower speed with the reference signal, it is recognized that the polarity of the error in the AREA1 and AREA3 is opposite to that in the AREA2. In this view, the linearzing converter 5 in the second embodiment reverses the polarity of the error obtained in the AREA2 to be identical to the polarity in the AREA1 and AREA3. Around the borders of the areas, the gain of the error decreases because the rate of change of the reference signal and the focus error signal decreases. Therefore, the linearizing converter 5 of the second embodiment increases the gain of the error for a predetermined time period after the switching of the area. The gain may be varied according to the level of the focus error signal.

With the above arrangement, even if the focus error signal which serves as the controlled value and the reference signal which serves as the target value are both non-linear signal, they can be apparently approximated to be linear as separately viewed in each area, and frequency bands thereof can apparently be small. Hence, the feedback control can be performed during the focus jump. Accordingly, the feedback control is always performed with respect to the accurate actuator position, and stable single focus jump can be carried out with high accuracy even if external disturbance such as the disc surface vibration or the irregularity of the surface spacing. It is noted that, similarly to the first embodiment, the area can be switched by the method using the peak detection or focus sum in this second embodiment.

While the above described embodiments employ the laser beam as the light beam, the present invention is not limited to this example, and an LED (light emitting diode) may also be used, for example. While the above embodiments are directed to the example in which the light beam spot is converged on the recording layer. However, the present invention is not limited to this feature, and a linear beam may be used to trace plural tracks at the same time. Further, in the above embodiments, the actuator itself is jumped to move the focused position of the light beam. However, the present invention is not limited to this feature, and the objective lens in the actuator may be actuated to move the focused position of the light beam.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 10-326936 filed on Nov. 17, 1998 including the specification, claims, drawings and summary is incorporated herein by reference in its entirety.

What is claimed is:

1. A focus jump device which is adapted to be used in an information reproduction apparatus for reproducing information from a storage medium having at least two recording layers or used in an information recording apparatus for recording information onto the storage medium and which moves a focus position of a light beam in a direction perpendicular to the storage medium to the focus position corresponding to a target recording layer so that the light beam is irradiated on the target recording layer, said device comprising:

a focus position moving unit for moving the focus position of the light beam;

a focus error signal detector for detecting a focus error signal based on a variation of a returning light from the storage medium, the variation of the returning light being based on a variation of the focus position of the light beam with respect to the recording layer;

a feedforward controller for supplying a drive signal to the focus position moving unit to move the focus position of the light beam in an acceleration state in an acceleration control mode and to move the focus position of the light beam in a deceleration state in a deceleration control mode;

a linearizing converter for linearizing the focus error signal, which is detected by the focus error signal detector during an interlayer jump for moving the focus position of the light beam to the target recording layer triggered by the acceleration control;

a reference position setting unit for setting a reference position indicating the focus position variation according to a passage of time as a target value; and a position controller for comparing an output value of the linearizing converter with a target value to generate an error, and for outputting the drive signal to the focus position moving unit to reduce the error thereby to control the focus position of the light beam.

2. The device according to claim 1, further comprising a time period setting unit for setting a time period, wherein the feedforward controller performs a constant speed control for a time period between the acceleration control mode and the deceleration control mode.

3. The device according to claim 2, wherein the time period of the constant speed control is set to be longer than the time periods of the acceleration control mode and the deceleration control mode.

4. The device according to claim 1, wherein the feedforward controller generates at least one acceleration pulse and at least one deceleration pulse as the drive signal by applying a second order differentiation on the target value;

performs a constant speed control in which no pulse is applied to the focus position moving unit after the acceleration control mode in which the at least one acceleration pulse is applied to the focus position moving unit;

and performs the deceleration control in which the at least one deceleration pulse is applied to the focus position moving unit after a completion of the constant speed control.

5. The device according to claim 1, wherein the feedforward controller
- generates at least one acceleration pulse and at least one deceleration pulse as the drive signal by applying a second order differentiation on the target value;
- performs the deceleration control in which a plurality of deceleration pulses are applied to the focus position moving unit stepwise after the acceleration control mode in which the at least one acceleration pulse is applied to the focus position moving unit;
- and performs a constant speed control in which no pulse is applied to the focus position moving unit in a time period between the acceleration pulse and the deceleration pulse and time periods between the deceleration pulses.

6. The device according to claim 1, wherein the feedforward controller.
- generates a plurality of acceleration pulses and at least one deceleration pulse as the drive signal by applying a second order differentiation on the target value;
- performs the deceleration control in which the at least one deceleration pulse is applied to the focus position moving unit after the acceleration control mode in which the plurality of acceleration pulses are applied to the focus position moving unit stepwise;
- and performs a constant speed control in which no pulse is applied to the focus position moving unit in time periods between the acceleration pulses and in a time period between the acceleration pulse and the deceleration pulse.

7. The device according to claim 1, further comprising a jumping distance setting unit for setting a jumping distance;
- wherein the feedforward controller includes a plurality of application patterns of acceleration pulse and deceleration pulse for the acceleration control and the deceleration control, and selects the application pattern in accordance with a jumping distance.

8. The device according to claim 1, wherein the feedforward controller comprises a profile setting unit for setting a profile indicating a variation of the focus position of the light beam according to a passage of time, and a feedforward compensator having a transfer function reverse to a transfer function of the focus position moving unit, the profile setting unit setting a profile including at least one focus position variation in a constant speed state between the focus position variation in the acceleration state from a start of a focus position movement and the focus position variation in the deceleration state up to an end of the focus position movement, the feedforward compensator applying a feedforward signal, which compensates for the profile, to the focus position moving unit.

9. The device according to claim 8, further comprising a linearizing converter for linearizing the focus error signal, wherein the position controller uses the profile set by the profile setting unit as a reference position serving as the predetermined target value, compares an output value of the linearizing converter with the reference position to obtain an error therebetween, and supplies the drive signal to the focus position moving unit to reduce the error.

10. The device according to claim 9, further comprising an area discriminator for discriminating whether the focus error signal detected by the focus error signal detector belongs to a first area in which the focus error signal is increasing or a second area in which the focus error signal is decreasing, wherein the linearizing converter comprises a plurality of different conversion tables for different areas and selects the conversion table based on a discrimination result by the area discriminator thereby to linearize the focus error signal.

11. The device according to claim 10, wherein the area discriminator discriminates whether the focus error signal detected by the focus error signal detector belongs to a first area in which the focus error signal is an increasing positive value or a decreasing negative value, or a second area in which the focus error signal is increasing or decreasing, or a third area in which the focus error signal is increasing negative value or a decreasing positive value.

12. The device according to claim 10, wherein the area discriminator discriminates the area based on a timing at which the focus error signal reaches a positive or a negative peak value.

13. The device according to claim 10, wherein the area discriminator discriminates the area based on a quantity of the light beam returning from the storage medium.

14. The device according to claim 1, further comprising a linearizing converter for linearizing the focus error signal, and a reference position setting unit for setting a reference position indicating the focus position variation according to a passage of time, wherein the feedforward controller compares an output value of the linearizing converter with the reference position to an error therebetween, and supplies the drive signal to the focus position moving unit to reduce the error.

15. The device according to claim 14, further comprising a detection method discriminator for discriminating a detection method of the focus error signal, wherein the linearizing converter comprises a plurality of different conversion tables for different areas for different detection methods, and wherein the linearizing converter selects the plurality of different conversion tables based on a discrimination result by the detection method discriminator and then selects the conversion table based on a discrimination result by the area discriminator thereby to linearize the focus error signal.

16. The device according to claim 14, wherein the reference position includes a focus position variation at least one focus position variation in the constant speed state between an acceleration state from a start of the focus position movement and a deceleration state up to an end of the focus position movement.

17. The device according to claim 1, further comprising a time period setting unit for setting a time period;
- wherein, if there is a constant time period in which the focus error signal or a quantity of the light beam returning from the storage medium is smaller than a predetermined threshold and is substantially constant, the position controller performs the feedforward control in a time period other than the constant time period.

18. The device according to claim 1, further comprising a focus servo controller for performing the focus position control of the light beam by feeding back a drive signal to the focus position moving unit such that the focus error signal becomes zero after the focus jump is finished, and each of the position controller and the focus servo controller comprises a phase compensator corresponding to its own control characteristic.

* * * * *